United States Patent
Lidian et al.

(10) Patent No.: US 10,027,387 B2
(45) Date of Patent: *Jul. 17, 2018

(54) METHOD AND APPARATUS IN A WIRELESS COMMUNICATION SYSTEM

(71) Applicant: TELEFONAKTIEBOLAGET L M ERICSSON (PUBL), Stockholm (SE)

(72) Inventors: Namir Lidian, Solna (SE); Alessandro Caverni, Stockholm (SE); Cagatay Konuskan, Stockholm (SE); Erik Larsson, Uppsala (SE); Peter Von Wrycza, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,941

(22) Filed: Mar. 1, 2017

(65) Prior Publication Data

US 2017/0244452 A1 Aug. 24, 2017

Related U.S. Application Data

(63) Continuation of application No. 14/237,144, filed as application No. PCT/SE2013/050686 on Jun. 13, 2013, now Pat. No. 9,590,704.

(Continued)

(51) Int. Cl.
*H04B 7/04* (2017.01)
*H04B 7/0417* (2017.01)
(Continued)

(52) U.S. Cl.
CPC ......... *H04B 7/0417* (2013.01); *H04B 7/0404* (2013.01); *H04L 1/1812* (2013.01);
(Continued)

(58) Field of Classification Search
CPC .. H04B 7/0404; H04B 7/0417; H04B 7/0486; H04L 1/1812; H04L 1/1874
See application file for complete search history.

(56) References Cited

U.S. PATENT DOCUMENTS 9,088,412 B2    7/2015   Yan et al.
2007/0047451 A1  3/2007   Lohr et al.
(Continued)

FOREIGN PATENT DOCUMENTS

CN    101228712 A    7/2008
CN    101611586 A    12/2009
(Continued)

OTHER PUBLICATIONS

3rd Generation Partnership Project; Technical Specification Group Radio Access Network; Medium Access Control (MAC) protocol specification (Release 11), 3GPP TS 25.321 V11.1.0, 2012, 198 pages.

(Continued)

*Primary Examiner* — Edan Orgad
*Assistant Examiner* — Nourali Mansoury
(74) *Attorney, Agent, or Firm* — Rothwell, Figg, Ernst & Manbeck, P.C.

(57) ABSTRACT

There is disclosed a method performed by a User Equipment, UE, for Hybrid Automatic Repeat Request, HARQ, retransmission of data in a multi-antenna wireless communication system. The method comprises, receiving Acknowledgement/Negative Acknowledgement, ACK/NACK, feedback information relating to data transmitted on two streams, and performing, upon rank reduction where only one stream is available for transmission, retransmission of data on a cancelled stream over the remaining stream. There is furthermore disclosed a UE configured for performing the (Continued)

method. A transmission method together with an arrangement for a UE is also disclosed.

25 Claims, 21 Drawing Sheets

Related U.S. Application Data

(60) Provisional application No. 61/703,940, filed on Sep. 21, 2012.

(51) Int. Cl.
| | |
|---|---|
| *H04L 1/18* | (2006.01) |
| *H04B 7/0404* | (2017.01) |
| *H04W 28/04* | (2009.01) |
| *H04W 72/06* | (2009.01) |
| *H04L 1/06* | (2006.01) |
| *H04B 7/0456* | (2017.01) |
| *H04B 7/06* | (2006.01) |

(52) U.S. Cl.
CPC .......... *H04L 1/1816* (2013.01); *H04L 1/1861* (2013.01); *H04L 1/1874* (2013.01); *H04L 1/1887* (2013.01); *H04W 28/04* (2013.01); *H04W 72/06* (2013.01); *H04B 7/0486* (2013.01); *H04B 7/0623* (2013.01); *H04L 1/06* (2013.01)

(56) References Cited

U.S. PATENT DOCUMENTS

| | | | |
|---|---|---|---|
| 2010/0054353 A1 | 3/2010 | Roh et al. | |
| 2010/0067459 A1 | 3/2010 | Göransson et al. | |
| 2010/0272033 A1 | 10/2010 | Fwu et al. | |
| 2012/0177089 A1 | 7/2012 | Pelletier et al. | |
| 2012/0287798 A1 | 11/2012 | Sambhwani et al. | |
| 2012/0287868 A1 | 11/2012 | Sambhwani et al. | |
| 2012/0287965 A1 | 11/2012 | Sambhwani et al. | |
| 2013/0021898 A1 | 1/2013 | Kang et al. | |
| 2013/0055275 A1 | 2/2013 | Comeau et al. | |
| 2013/0195044 A1 | 8/2013 | Pelletier et al. | |
| 2013/0229906 A1 | 9/2013 | Akkarakaran et al. | |
| 2013/0242920 A1 | 9/2013 | Wang et al. | |
| 2013/0343306 A1* | 12/2013 | Cozzo .................. | H04W 72/02 370/329 |
| 2014/0022991 A1 | 1/2014 | Chu | |
| 2014/0064189 A1 | 3/2014 | Larsson et al. | |
| 2014/0241254 A1* | 8/2014 | Kaur .................. | H04L 1/1812 370/329 |
| 2014/0245095 A1 | 8/2014 | Nammi et al. | |
| 2014/0342747 A1 | 11/2014 | Lee et al. | |
| 2016/0294459 A1* | 10/2016 | Xi .................. | H04L 5/003 |

FOREIGN PATENT DOCUMENTS

| | | |
|---|---|---|
| CN | 102208969 A | 10/2011 |
| EP | 1 833 228 A1 | 9/2007 |
| EP | 1 843 502 A1 | 10/2007 |
| EP | 2 434 679 A1 | 3/2012 |
| GB | 2 420 249 A | 5/2006 |
| JP | 2011510556 A | 3/2011 |
| RU | 2364036 C2 | 8/2009 |
| RU | 2460228 C1 | 8/2012 |
| WO | 2011136554 A2 | 11/2011 |

OTHER PUBLICATIONS

3rd Generation Partnership Project; Technical Specification Group Radio Access Network; Multiplexing and channel coding (FDD) (Release 11), 3GPP TS 25.212 V11.2.0, 2012, 130 pages.
Pantech "On CSI ambiguity handling with activation/deactivation" 3GPP TSG-RAN WG1 #65 R1-111642, 2011, 3 pages.
TSG RAN WG 1 "LS on RAN1 agreements on MIMO with 64QAM for HSUPA" 3GPP TSG RAN WG1 Meeting #70, R1-124014, 2012, 3 pages.
3GPP TSG-RAN Meeting #80, R2-125922, 2012, 20 pages.
3GPP TSG-WG2 Meeting #80, R2-125923, 2012, 11 pages.
3GPP TSG-RAN2 Meeting #80, R2-125925, 2012, 71 pages.
3GPP TSG-RAN2 Meeting #80, R2-125931, 2012, 11 pages.
3GPP TSG-RAN2 Meeting #80, R2-125933, 2012, 32 pages.
TSG RAN WG2 "RAN2 agreed CRs on MIMO with 64QAM for HSUPA" 3GPP TSG-RAN Meeting #58, RP-121945, 2012, 1 pages.
Notice of Ground for Rejection dated Mar. 22, 2016, issued in Japanese Patent Application No. 2015-531887, 6 pages.
QUALCOMM Incorporated "HARQ retransmission operation for UL MIMO" 3GPP TSG RAN WG1 Meeting #69, R1-122858, 2012, 4 pages.
Notification on the Results of Patentability Examination dated Aug. 4, 2016, issued in Russian Patent Application No. 2015114804/08(023135), 12 pages.
Chinese Office Action dated Mar. 21, 2017, issued in Chinese Patent Application No. 201380048846.6, 5 pages.
Philips "Fallback mode for Rel-7 RDD MIMO scheme" 3GPP TSG RAN WG1 Meeting #46, Tdoc R1-061952, Aug. 28-Sep. 1, 2006, 4 pages.

\* cited by examiner

Table 1

| time | Rx/Tx | Rank | HARQ A | | | | | CURRENT_HARQ_PROCESS_ID | HARQ B | | | | | Node B | |
|---|---|---|---|---|---|---|---|---|---|---|---|---|---|---|---|
| | | | RSN | Trans | Buffer | Stream | E-HICH signature | | RSN | Trans | Buffer | Stream | E-HICH signature | E-HICH using primary signature | E-HICH using secondary signature |
| 0 | Tx | 2 | 1 | 1 | TB 1 | 1 | | | 0 | 0 | TB 2 | 2 | | | |
| 1 | Rx | - | 1 | 1 | Empty | - | ACK | | 0 | 0 | TB 2 | - | NACK | ACK | NACK |
| 2 | Tx | 1 | 1 | 1 | Empty | Switch | NACK | | 1 | 1 | TB 2 | 1 | | | |
| 3 | Rx | - | | | | | | | | | | | | NACK | - |

Fig.21

METHOD AND APPARATUS IN A WIRELESS COMMUNICATION SYSTEM

CROSS REFERENCE TO RELATED APPLICATION(S)

This application is a continuation of U.S. application Ser. No. 14/237,144, filed Feb. 4, 2014, which is a 35 U.S.C. § 371 National Phase Entry Application from PCT/SE2013/050686, filed Jun. 13, 2013, designating the United States, and also claims the benefit of U.S. Provisional Application No. 61/703,940, filed Sep. 21, 2012. The disclosures of which are incorporated herein in their entirety by reference.

TECHNICAL FIELD

The present invention relates to wireless communication systems in general and specifically to retransmissions in multi antenna wireless communication systems.

BACKGROUND

One radio access technology in present day wireless communication systems is the hierarchical so-called Wideband Code Division Multiple Access (WCDMA), see FIG. 1. Within WCDMA, a terminal or user equipment (UE) communicates with one or several Node Bs. The Node B refers to a logical node that is responsible for physical-layer processing such as error correction coding, modulation and spreading, as well as conversion from base band to the radio-frequency signal transmitted from the antenna(s). A Node B is handling transmission and reception in one or several cells. Further, a radio network controller (RNC) controls multiple Node Bs and is responsible from call setup, quality of service handling and management of radio resources in the cells for which it is responsible. In addition, the so-called Automatic Repeat Request (ARQ) protocol handling retransmissions of erroneous or missing data is located in the RNC.

The processing in WCDMA is structured into different layers, with the radio link control (RLC) at the top of the protocol stack, followed by the media access layer (MAC) and the physical layer. The MAC layer offers services to the RLC in the form of so-called logical channels. The MAC layer can multiplex data from multiple logical channels. It is also responsible for determining the transport format of the data sent to the next layer, the physical layer. The interface between the MAC and the physical layer is specified through so-called transport channels over which data in the form of transport blocks (TB) are transferred. In each transmission time interval (TTI), one or several transport blocks are fed from the MAC layer to the physical layer, which performs coding, interleaving, multiplexing, spreading etc. prior to data transmission. The different protocol layers are configured by the radio resource control (RRC), which performs admission control, handover decisions, and active set management for soft handover.

The introduction of high-speed downlink packet access (HSDPA) enhances the WCDMA downlink packet-data performance and capabilities in terms of higher peak data rate, reduced latency, and increased capacity by including higher-order modulation, rate control, channel-dependent scheduling, and so-called hybrid ARQ (HARQ) with soft combining. The HARQ enables a terminal or user equipment to request retransmission of erroneously received transport blocks, effectively fine-tuning the effective code rate and compensating for errors made by the link-adaptation mechanism. A corresponding development for the uplink has been implemented through the so called enhanced uplink or high-speed uplink packet access (HSUPA), which improves the WCDMA uplink capabilities and performance in terms of higher data rates, reduced latency and improved system capacity. The combination of HSDPA and HSUPA is commonly referred to as high-speed packet access (HSPA).

In HARQ for HSUPA for each transport block received in the uplink, a single bit is transmitted on the so-called E-DCH Hybrid ARQ Indicator Channel (E-HICH) from the Node B to the UE to indicate successful decoding (ACK) or to request a retransmission of the erroneously received transport block (NACK). The E-HICH is a downlink dedicated physical channel, carrying the binary HARQ acknowledgements to inform the UE about the outcome of the E-DCH detection at the Node B. The Node B transmits either ACK or NACK, depending on whether the decoding of the corresponding E-DCH transport block was successful or if a retransmission is requested. To not unnecessarily waste downlink transmission power, nothing is transmitted on the E-HICH if the Node B did not detect a transmission attempt; that is, no energy was detected on the E-DCH Dedicated Physical Control Channel, E-E-DPCCH, or E-DCH Dedicated Physical Data Control Channel, E-DPDCH. E-DPDCH is used to carry the E-DCH Transport Channel and E-DPCCH is used to carry the control information related with the E-DCH.

Recently, the HSUPA has been further extended with multiple input multiple output (MIMO) in order to increase peak data rates through multi-stream transmission. The term MIMO is commonly used to denote the transmission of multiple layers or multiple streams as a mean to increase the data rate possible in a given channel. In case of HSUPA in frequency division duplex (FDD), the additional use of MIMO introduces the possibility for a UE to simultaneously transmit up to two Media Access Control Protocol Data Units, MAC PDUs, (e.g. MAC i/is) (transport blocks) in a same TTI on orthogonal beams e.g. virtual antennas.

This introduces new problems when HARQ schemes are used. Consequently, there is a need for methods and arrangements to enable improved retransmissions for MIMO HSUPA in FDD.

SUMMARY

A general object of the proposed technology is improved retransmissions in HSUPA in FDD. More specifically an object is to provide time efficient and robust HARQ transmissions and retransmissions in the case of rank reduction in a multi-antenna wireless communication system.

According to a basic aspect, the present disclosure presents a method of transmitting transport blocks on two streams, reducing the rank of transmissions, and associating received ACK/NACK feedback information with the correct HARQ entity or process, and retransmitting any requested TBs based on the association. The reduction in rank can be caused by a forced fallback to a lower rank if the UE lacks sufficient power, or that a selected TB size is smaller than a minimum allowed TB size for the current rank, or some other situation in which the UE is forced to change from a higher rank to a lower rank.

According to another aspect the present disclosure provides a method performed by a User Equipment, UE, for Hybrid Automatic Repeat Request, HARQ, retransmission of data in a multi-antenna wireless communication system. The method comprises the steps of receiving Acknowledgement/Negative Acknowledgement, ACK/NACK, feedback information relating to data transmitted on two streams, and performing, upon rank reduction where only one stream is available for transmission, retransmission of data of a cancelled stream over the remaining stream.

According to a further aspect, the present disclosure presents an arrangement in a user equipment which includes a transmitter unit for transmitting transport blocks on two streams, a rank controller configured to reduce the rank of transmissions if requested, and an ACK/NACK feedback information receiver configured for receiving ACK/NACK feedback information relating to the transmitted transport blocks, and an associating unit configured for associating received ACK/NACK feedback information with the correct HARQ entity or process, and a retransmitting unit configured for retransmitting any requested TBs based on the association.

According to yet another aspect of the present disclosure there is presented a User Equipment, UE, for Hybrid Automatic Repeat Request, HARQ, retransmission of data in a multi-antenna wireless communication system. The UE comprises an Acknowledgement/Negative Acknowledgement, ACK/NACK, feed-back information unit configured to receive ACK/NACK feedback information relating to data transmitted on two streams, and a retransmission unit configured to retransmit data of a cancelled stream over the remaining stream upon a rank reduction where only one stream is available for transmission.

Advantages of the present disclosure include accurate ACK/NACK feedback information handling (i.e. feedback associated with correct HARQ processes) which will cause less data transmission errors (RLC retransmissions) and consequently will increase the performance.

BRIEF DESCRIPTION OF THE DRAWINGS

The disclosure, together with further objects and advantages thereof, may best be understood by referring to the following description taken together with the accompanying drawings, in which:

FIG. 21 is a table illustrating a signaling sequence of an example according to the present disclosure.

ABBREVIATIONS

ACK Acknowledgement
ARQ Automatic Repeat Request
CC Chase combining
DL Downlink
E-DCH Enhanced Dedicated Channel
E-DPCCH E-DCH Dedicated Physical Control Channel
E-HICH E-DCH Hybrid ARQ Indicator Channel
E-TFC E-DCH Transport Format Combination
HARQ Hybrid ARQ
HARQ_RTT HARQ round-trip-time
HSDPA High Speed Downlink Packet Access
HSUPA High-Speed Uplink Packet Access
IR Incremental Redundancy
MAC Medium Access Control
MIMO Multiple Input Multiple Output
NACK Negative Acknowledgement
PDU Protocol Data Unit
QAM Quadrature Amplitude Modulation
RRC Radio Resource Control
RSN Retransmission Sequence Number
RTT Round Trip Time
SAP Service Access Point
S-E-DPCCH Secondary E-DPCCH
TB Transport Block
TTI Transmission Time Interval

DETAILED DESCRIPTION

The proposed technology is in the area of wireless communication systems, in particular to HSUPA in WCDMA. It describes embodiments of methods and arrangements for supporting retransmissions within MIMO enabled HSUPA with FDD. In order to provide some in depth knowledge about the problems related to current HSUPA implementations, a detailed description about the current standard and problems associated therewith follows below.

Currently the work item 'MIMO with 64QAM for HSUPA' is discussed within 3GPP standardization [2]. The objective of this work item is to specify the support of uplink 2×2 MIMO with 64QAM (64 Quadrature Amplitude Modulation) as an additional feature for HSUPA in frequency division duplex (FDD). Uplink (UL) MIMO allows a UE to simultaneously transmit up to two MAC-i/is PDUs (transports blocks) in the same TTI on orthogonal beams (virtual antennas).

Figure 1:
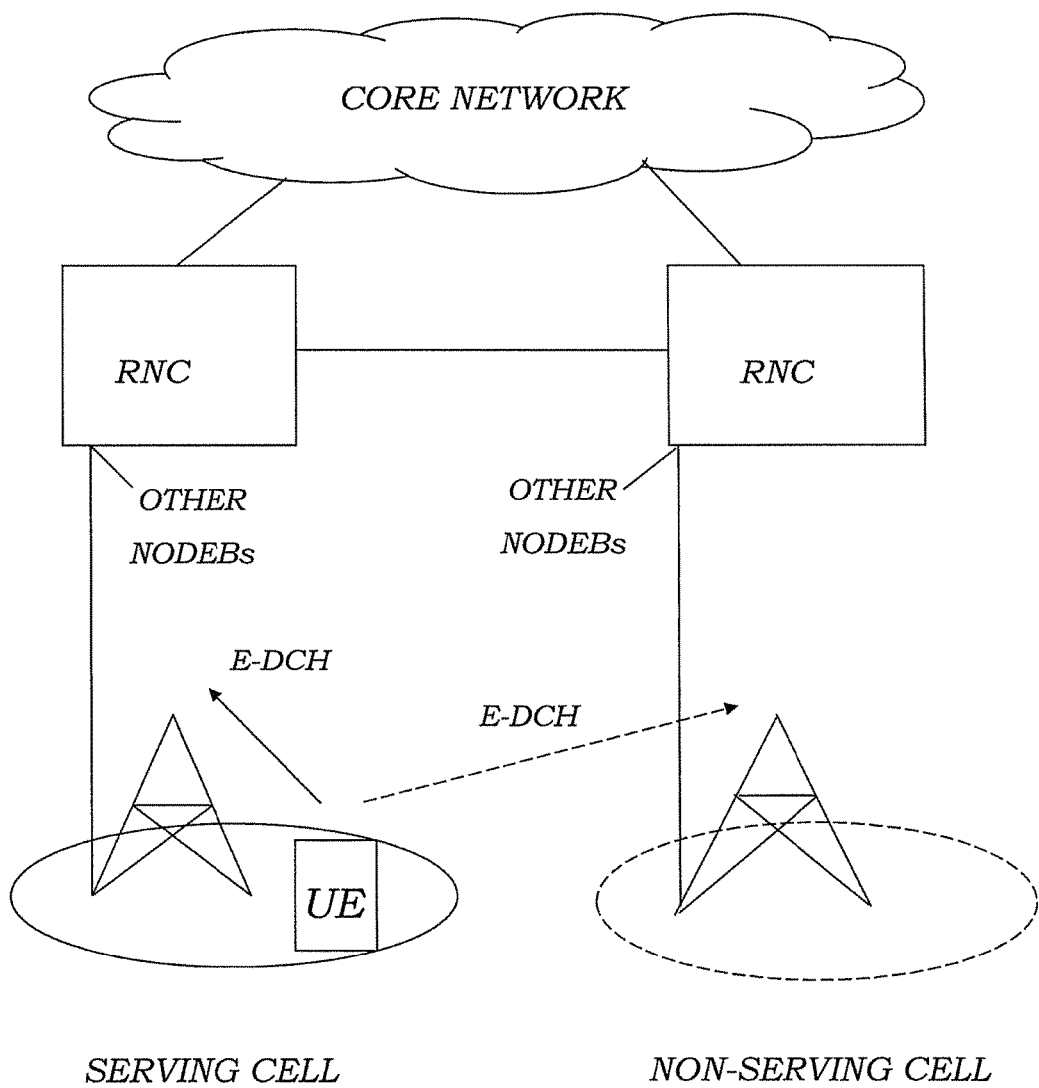
FIG. 1 is a schematic illustration of a wireless communication system.
Figure 2:
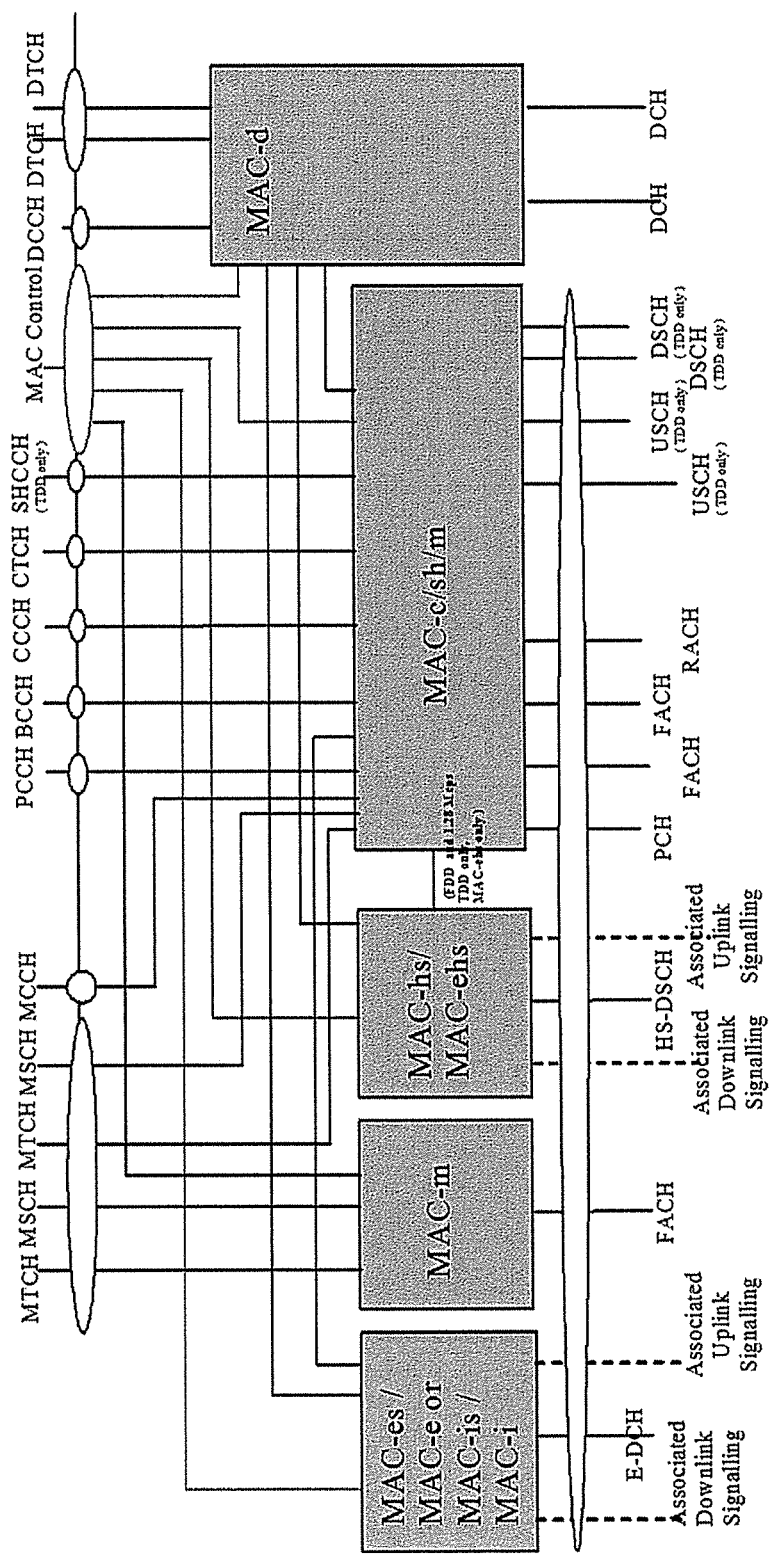
FIG. 2 is an illustration of the UE side MAC architecture

A schematic illustration of the traffic related architecture of the UE side MAC in which the present technology is described in FIG. 2. The MAC functionality of the UE is divided into a plurality of entities, each responsible for handling a particular aspect. The MAC functionality that is most relevant for the current disclosure is the so-called MAC-e/es or MAC-i/is, which controls access to the E-DCH transport channel. Upper layers configure which of the two entities, MAC-e/es or MAC-i/is, is to be applied to handle the E-DCH functionality. The mapping of logical channels on transport channels depends on the multiplexing that is configured by RRC, and the MAC Control SAP is used to transfer Control information to each MAC entity. The associated signaling shown in the figure illustrates the exchange of information between layer 1 (L1) and layer 2 (L2) provided by primitives.

The uplink HSPA Hybrid ARQ functionality is built on a synchronous, non-adaptive operation. Hence, uplink retransmissions follow a deterministic pattern and occur at a predefined time after the initial transmission. This also means that the UE and the Node B knows which HARQ process that is targeted at a specific TTI. Non-adaptive operation implies that the transport format and the redundancy version to be used for each of the retransmissions are known from time of the original transmission. Retransmitted bits (controlled via the redundancy version) consists of either the same bits as in the prior transmission or a new set of bits based on the same set of information bits, depending on if CC (Chase-Combining) or IR (Incremental Redundancy) soft combining is used. Furthermore, there is a need to indicate to the receiver whether the soft buffer should be cleared, i.e. if the transmission is an initial transmission or if soft combining with previous transmissions should take place. In principle, a 'new data indicator' bit should suffice to indicate a new transmission. However, due to soft handover in the UL, a more robust mechanism is needed and provided by the RSN (re-submission number).

According to the specification [3], each UE is provided with one HARQ entity consisting of multiple HARQ processes, per E-DCH. The number of HARQ processes should preferably match the round-trip time, and is set to 8 for 2 ms TTI and 4 for 10 ms TTI The HARQ entity is responsible for handling the MAC functions relating to the HARQ protocol, see FIG. 3, for example to provide layer-1 with MAC related information such as the E-TFC, the retransmission sequence number (RSN), and the HARQ power offset. Each HARQ process has an associated HARQ buffer used to store MAC-i/e PDU. Furthermore, each HARQ process keeps track of the RSN and number of retransmissions. The detailed configuration of the hybrid ARQ protocol is provided by RRC over the MAC-Control SAP.

UL HARQ information (i.e. the RSN number) is conveyed on the E-DPCCH, and DL HARQ information (i.e. ACK/NACK) is transmitted on the E-HICH from each cell in the E-DCH active set. The RSN is used to inform the Node B(s) about the current uplink HARQ transmission number. Because of the limitation in the field size (2 bits), the RSN saturates at 3 even though more number of retransmissions can be used before counting the packet as failed and rely on RLC retransmission. The combination of the RSN and the transmission timing allows the receiver to determine the exact transmission number (see [4]). The ACK/NACK feedback information indicates to the UE whether the corresponding UL transmission was successfully or un-successfully decoded. This information allows the UE to know whether to make another transmission for the same MAC-e or MAC-i PDU or to start a new transmission. The length of the ACK/NACK field is 1 bit.

As mentioned previously, in order to introduce HSUPA MIMO with 64QAM, valid HARQ and retransmission procedures need to be standardized. One question that needs to be addressed is how to make sure that ACK/NACK feedback information is associated with the correct HARQ process, in particular when a transport block is transmitted on different streams at different transmission times.

Consequently, the inventors suggest a solution in which the UE or HARQ entity of the UE is configured to associate incoming ACK/NACK feedback information with the correct HARQ process, based on some predetermined criteria, examples of which will be described in detail below.

As mentioned previously, in HSUPA MIMO for FDD, one or two independently encoded transport blocks (TBs) are transmitted depending on the preferred rank, one transport block in case of Rank 1 and two transport blocks in case of Rank 2. The primary TB (E-DPDCH) is transmitted on the primary stream and the secondary TB (S-E-DPDCH) is transmitted on the secondary stream (in case of Rank 2). The primary stream control channel E-DPCCH carries the RSN associated with E-DPDCH, and similarly S-E-DPCCH carries the RSN associated with S-E-DPCCH. Downlink related HARQ information (ACK or NACK) is transmitted on the E-HICH. Two independent E-HICH channels are used to acknowledge a Rank 2 transmission. The primary E-HICH carries ACK/NACK associated with the primary stream data (E-DPDCH) and the secondary E-HICH carries ACK/NACK associated with the secondary stream data (S-E-DPDCH).

Figure 4:
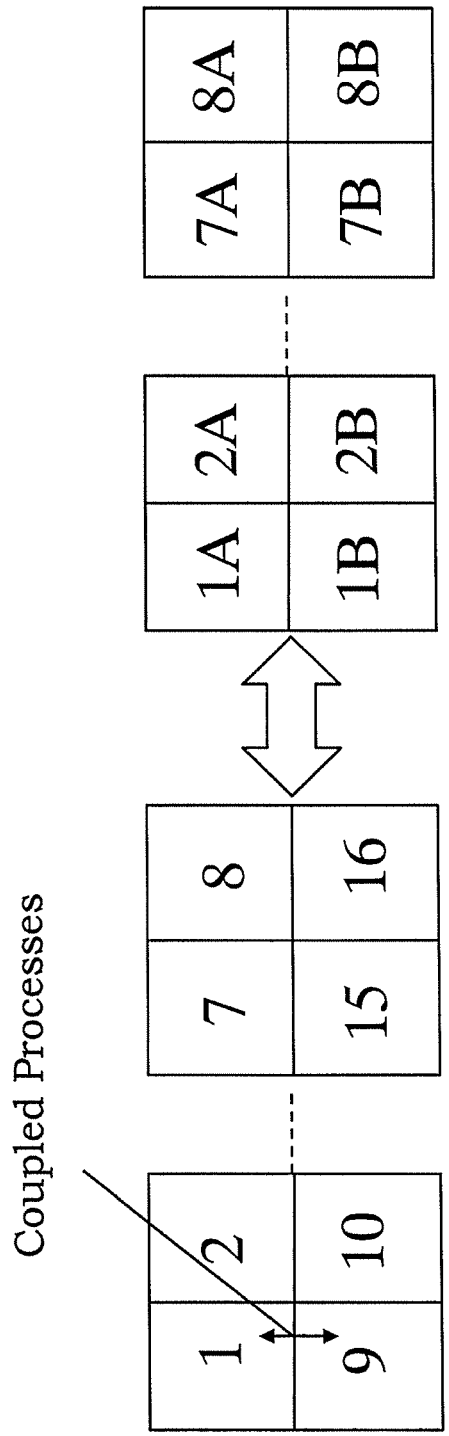
FIG. 4 is an illustration of embodiments of coupled HARQ processes according to the current disclosure.

In order to introduce the previously discussed HSUPA MIMO with 64QAM, the HARQ and retransmission procedures need to be updated. Since there can be up to two transport blocks transmitted each TTI, the inventors have identified the need to double the effective number of HARQ processes, and coupling the HARQ processes in pairs (one for each stream). Typically, there is one HARQ entity per E-DCH, but according to the present disclosure, the inventors suggest having one HARQ process per TTI for single stream transmission e.g. rank 1, and two coupled HARQ processes per TTI for dual stream transmission e.g. rank 2. The exact handling of how to couple HARQ processes is not decided yet but examples are given in FIG. 4. Throughout this disclosure the notation of HARQ process A & B will be used to distinguish between the two coupled processes. However, as pointed out above, other means to target/distinguish them can be envisioned, and the disclosure is by no means limited to the chosen alternative, which is chosen to simplify the presentation. One, already mentioned, question that needs to be addressed is how to make sure that ACK/NACK feedback information is associated with a correct HARQ process, in particular when a transport block is transmitted on different streams at different transmission instances. One such exemplifying case is a request for retransmission of a TB that was originally transmitted on a secondary stream after a UE has been forced to reduce its rank from e.g. Rank 2 to Rank 1. In this case, the stream on which the requested TB was originally transmitted is no longer available, thus leaving the UE in doubt as to which TB e.g. which HARQ process that is requested for retransmission.

One possible solution would be to introduce an explicit HARQ process identity (e.g. A & B as chosen here). However, this would give an increased signaling overhead, and requires a re-design of all UL/DL control channels carrying HARQ related information. Consequently, another solution that does not require any additional feedback information or re-design of control channels will be presented.

In this disclosure, the inventors suggest a modification to the MAC-i/is entity functionality at the UE side that ensures that ACK/NACK feedback information is associated with the correct HARQ process. In particular, the mechanism makes it possible for a retransmission to switch stream without the need to introduce an explicit HARQ identity number and hence without the need to change the control channel structures. Furthermore, the inventors propose to use known information about the E-HICH signature to make the feedback ACK/NACK processing more robust in case of signaling or detection errors.

This disclosure provides a mechanism that ensures that ACK/NACK feedback information is associated with the correct HARQ process. In particular, it allows retransmissions to switch stream (e.g. retransmit original stream data (say secondary stream on primary stream)) without the need to introduce a HARQ identity number and hence without the need to change the control channel structures.

3GPP RAN WG1 has discussed the retransmission scenarios for UL MIMO with 64QAM [2]. Depending on the preferred rank signaled by the network (serving Node B), different UE transmit scenarios are foreseen by the inventors:

1) The Signaled Preferred Rank is Two (Rank 2)
    a. TBs associated with HARQ processes A are always mapped to the primary stream and TBs associated with HARQ processes B are always mapped to the secondary stream. Consequently, retransmissions will always be sent on the original stream as long as the rank does not change from two.
2) Preferred Rank is One (Either Signaled by the Network or Due to a Forced UE Fallback from Rank 2 to Rank 1)
    a. If both transport blocks (TB associated with HARQ process A mapped to the primary stream and TB associated with HARQ process B mapped to the secondary stream) need to be retransmitted, then the UE must override the network preferred rank 1 and use rank 2 transmission instead and re-transmit both packets according to point 1) above.
    b. Else If only the TB associated with HARQ process A mapped to the primary stream needs to be retransmitted, then this TB is retransmitted on the primary stream.
    c. Else If only the TB associated with HARQ process B (originally transmitted on the secondary stream) needs to be retransmitted, then this TB is retransmitted on the primary stream. This case is referred to as a stream switch. In other words, a TB associated with HARQ process B that was initially transmitted on the secondary stream gets retransmitted on the primary stream using rank1.

Figure 9:
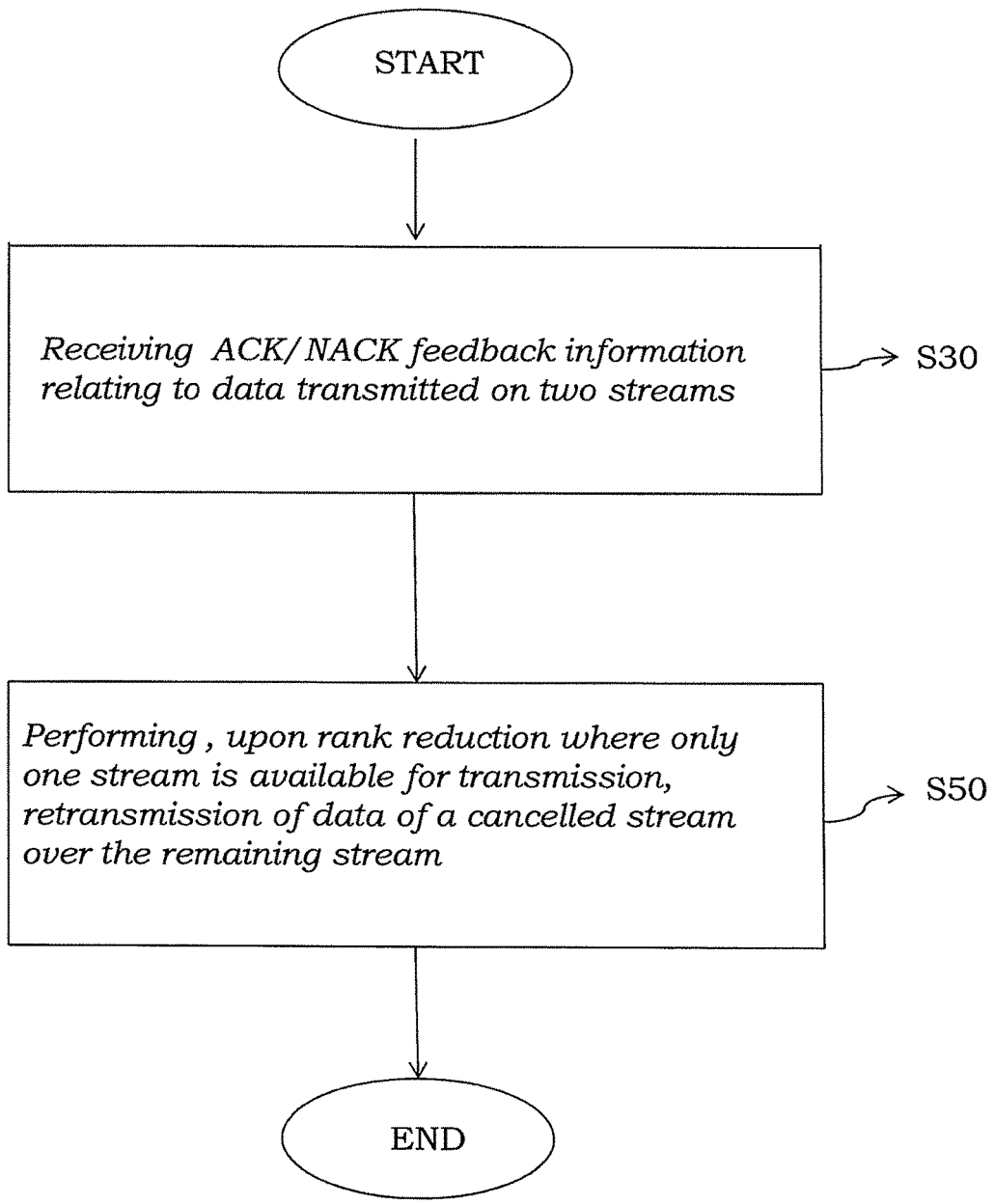
FIG. 9 is a flow diagram illustrating an example of an embodiment of a retransmission method according to the present disclosure.

Thus, to provide for time efficient and robust HARQ retransmission in the case of a rank reduction there is provided a method performed by a User Equipment, UE, for Hybrid Automatic Repeat Request, HARQ, retransmission of data in a multi-antenna wireless communication system. The method comprises the steps of receiving S30 Acknowledgement/Negative Acknowledgement, ACK/NACK, feedback information relating to data transmitted on two streams, and retransmitting S50, upon rank reduction where only one stream is available for transmission, data of a cancelled stream over the remaining stream. This method is schematically illustrated in FIG. 9. utilizing such a method in a UE there is no need to wait for the rank to increase, instead uplink retransmissions can be performed more or less continuously.

An embodiment of the above given HARQ retransmission method relates to the case of a rank reduction from a rank 2 transmission mode, where data is transmitted over a primary stream and a secondary stream, to a rank 1 transmission mode, where data is transmitted over the primary stream. Here the retransmitting step will comprise retransmitting data associated with a NACK from the secondary stream over the primary stream. In this way it is provided a method that allows for a continuous retransmission of data even if a forced rank reduction has occurred.

Figure 10:
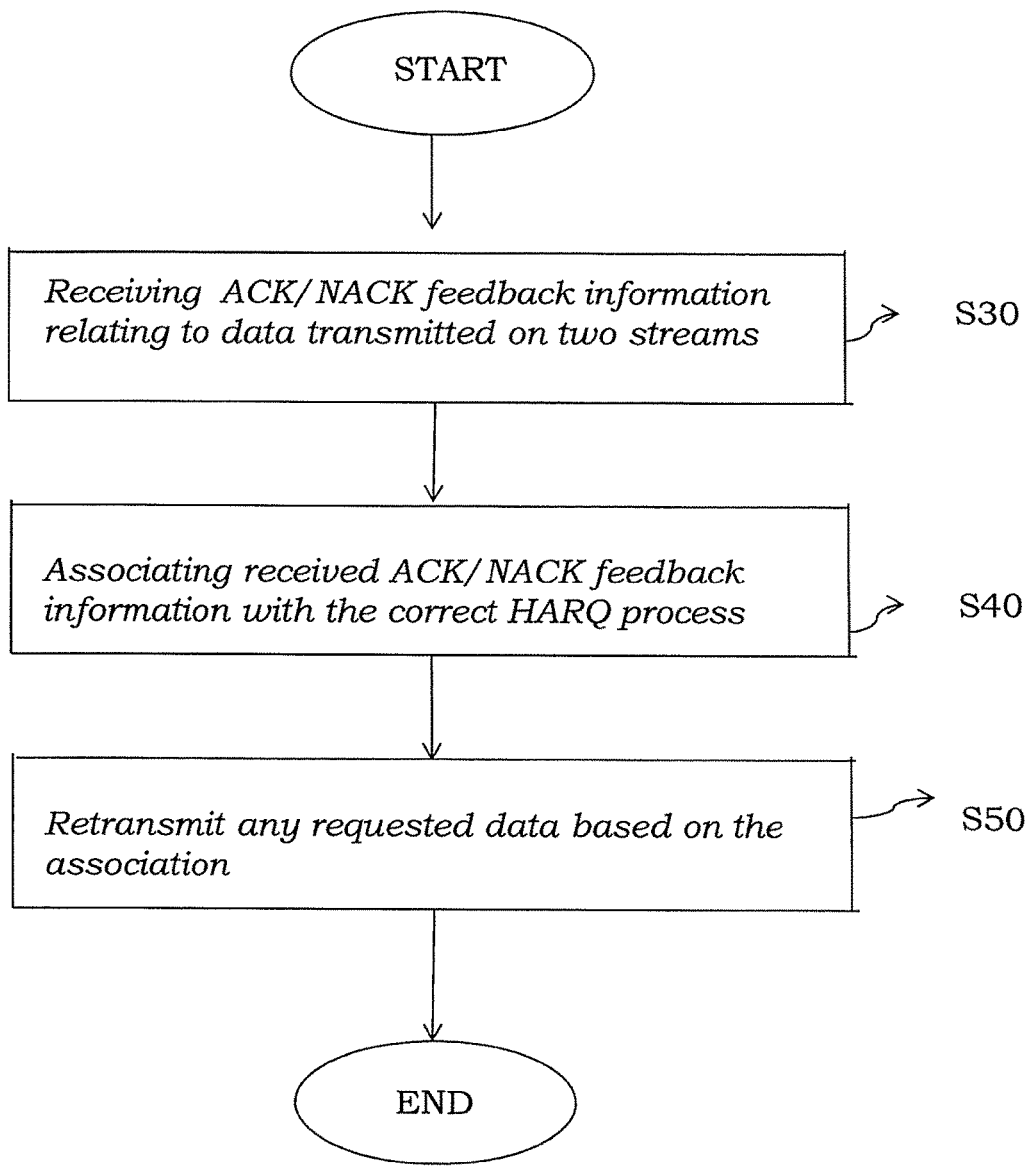
FIG. 10 is a flow diagram illustrating an example of an embodiment of a retransmission method according to the present disclosure.

In FIG. 10 there is shown an example of yet another embodiment of the HARQ retransmission method. Here the method comprises the step of associating S40 the received ACK/NACK feedback information with the correct HARQ process, and retransmit any requested data based on the association. In this way the UE utilizes the received feedback information to ascertain that the correct data is retransmitted. This will provide for a reliable and robust retransmission method where only the requested data is retransmitted. Moreover there is no need to alter the existing control channel structure.

In an example of an embodiment the associating step S40 comprises the step of deciding which HARQ process that should be targeted when the ACK/NACK feedback information is received.

In a particular example of an embodiment, the associating step S40 comprises associating ACK/NACK feedback information representing a request for retransmission with the HARQ process of the cancelled secondary stream so that the UE retransmits requested data on the primary stream instead of the secondary stream.

The retransmission method for a UE described above finds a particular use for a UE configured for uplink, Multiple Input Multiple Output, MIMO, wherein the data to be retransmitted are Transport Blocks, TBs.

It is possible and advantageous to utilize the retransmission method for a UE as described above in a multi-antenna wireless communication system supporting Multiple Input Multiple Output, MIMO, enabled High Speed Uplink Packet Access, HSUPA, with Frequency Division Duplex, FDD.

In a possible example for the embodiments given above the primary and secondary streams are carried on Enhanced Dedicated Channels, E-DCH and the ACK/NACK feedback information is carried on E-DCH Hybrid ARQ indicator Channels, E-HICH.

Since the above given embodiments of a retransmission method in a UE enables a continued retransmission even after a reduction in rank has occurred the method provides for an efficient use of the resources in a multi antenna wireless communication system.

Figure 17:
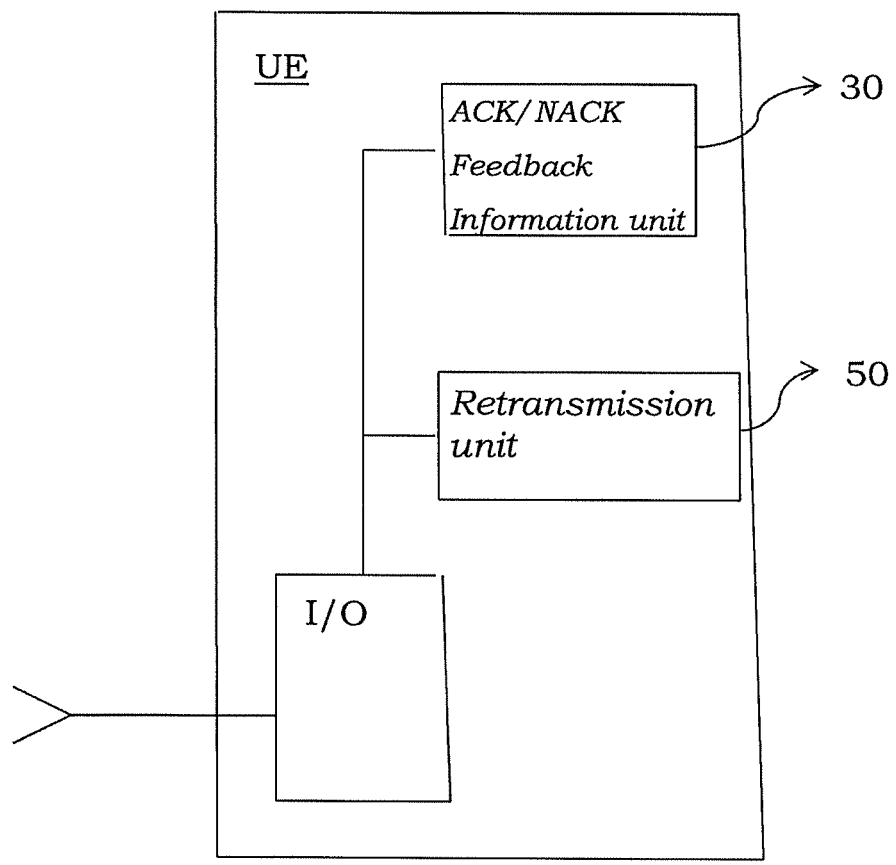
FIG. 17 is a block chart of an example of a UE configured for HARQ retransmissions according to the present disclosure.

A user equipment, UE, configured to perform the Hybrid Automatic Repeat Request, HARQ, retransmission as described above is illustrated in FIG. 17. The UE comprises an Acknowledgement/Negative Acknowledgement, ACK/NACK, feed-back information unit 30 that is configured to receive ACK/NACK feedback information relating to data transmitted on two streams. Further it comprises a retransmission unit 50 that is configured to retransmit data of a cancelled stream over the remaining stream upon a rank reduction where only one stream is available for transmission.

By way of example, the UE is configured to reduce the rank from a rank 2 transmission mode, where data is transmitted over a primary stream and a secondary stream, to a rank 1 transmission mode, where data is transmitted over the primary stream. It is also configured to retransmit data associated with a NACK from the secondary stream over the primary stream by means of a retransmission unit 50.

Figure 18:
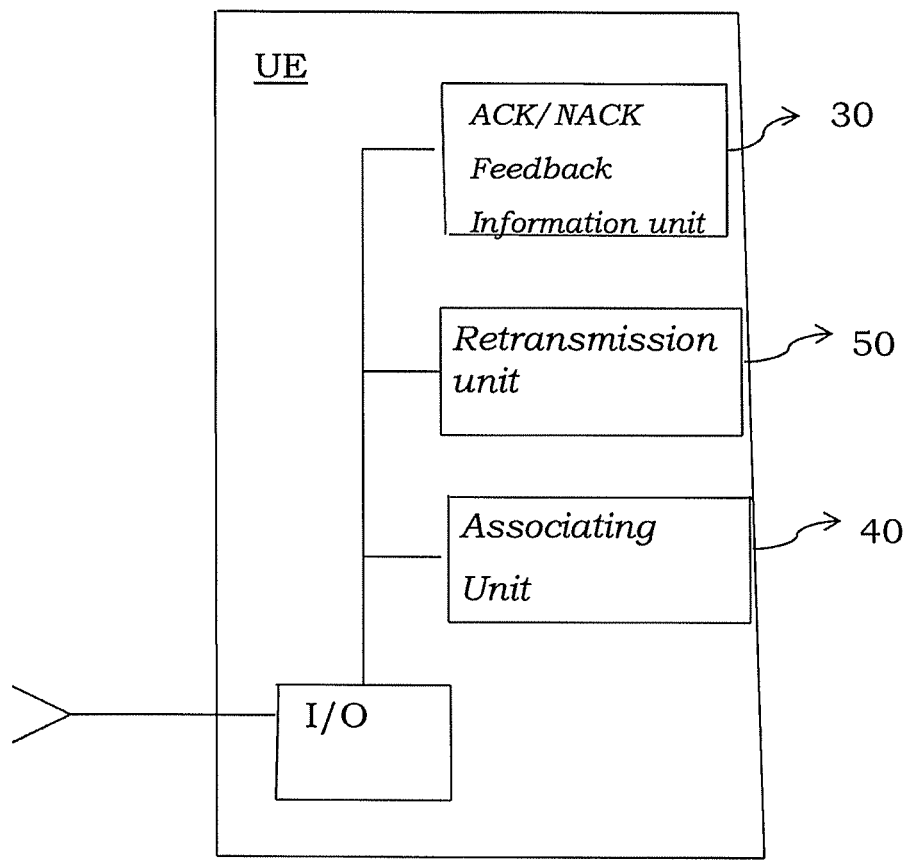
FIG. 18 is a block chart of an example of an alternative UE configured for HARQ retransmissions according to the present disclosure.

In a preferred example is the UE configured to associate the received ACK/NACK feedback information with the correct HARQ process by means of an associating unit 40, and retransmit any requested data based on the association. This example of an embodiment of a UE is illustrate in FIG. 18

Preferably the UE is configured to decide which HARQ process that should be targeted when the ACK/NACK information is received.

By way of example, the User Equipment is preferably configured to associate ACK/NACK feedback information representing a request for retransmission with the HARQ process of the cancelled secondary stream and retransmit requested data on the primary stream instead of the secondary stream.

The UE may preferably be configured for uplink Multiple Input Multiple Output, MIMO when the data are Transport Blocks, TBs.

In a preferred embodiment is the UE configured for Multiple Input Multiple Output, MIMO, enabled High Speed Uplink Packet Access, HSUPA, with Frequency Division Duplex, FDD.

In a possible embodiment of the UE are the primary stream and secondary stream carried on Enhanced Dedicated Channels, E-DCH and the ACK/NACK feedback information is carried on E-DCH Hybrid ARQ indicator Channels, E-HICH.

Similarly, different scenarios for the ACK/NACK feedback handling occur. Typically, ACK/NACK feedback information on the primary E-HICH corresponds to HARQ process A and ACK/NACK feedback information on the secondary E-HICH corresponds to HARQ process B in all cases. However, if one E-HICH is transmitted (and detected) and HARQ process B expects feedback info (i.e. a stream switch occurred at transmission) a different problem occurs. Consequently, the HARQ entity in the UE needs to be able to associate the received ACK/NACK with the proper HARQ process, namely the HARQ B.

Hence, in order to correctly handle the case when a TB is transmitted on different streams at different transmission instances (the stream switch scenario), the inventors have come to the realization that a 'stream switch' functionality needs to be introduced in the HARQ entity e.g. MAC i/is for E-DCH. In essence the HARQ entity needs to be configured with means to know/remember on which stream each HARQ process is transmitted, i.e. when feedback information (ACK/NACK) is received the HARQ entity must know which of the two coupled HARQ processes (A or B) that should be targeted.

In the case of implementing the approach of coupled HARQ entities or processes and transmitting TBs on at least two parallel streams, (Rank 2) one new problem may arise. Consider the case where a UE is in a Rank 2 transmission mode, e.g. TBs are transmitted on both a primary and a secondary stream, and a Node B successfully receives and decodes the primary stream and thereby sends an ACK, but the secondary stream is not received and decoded and the Node B transmits a NACK to the UE. However, during the interval between transmission of the TBs and reception of ACK/NACK or after the reception of ACK/NACK, the UE has changed from Rank 2 to Rank 1 transmission mode. In other words, only one stream, say the primary stream is available for transmissions. It has been recognized by the inventors that it would be beneficial to be able to perform the retransmission of NACK TB on the primary stream in response to receiving the NACK. Therefore, the inventors suggest implementing a switching process, in which a change from Rank 2 to Rank 1 transmissions causes any retransmissions on a cancelled stream to be executed on the remaining stream, say primary stream in the case above.

Figure 6:
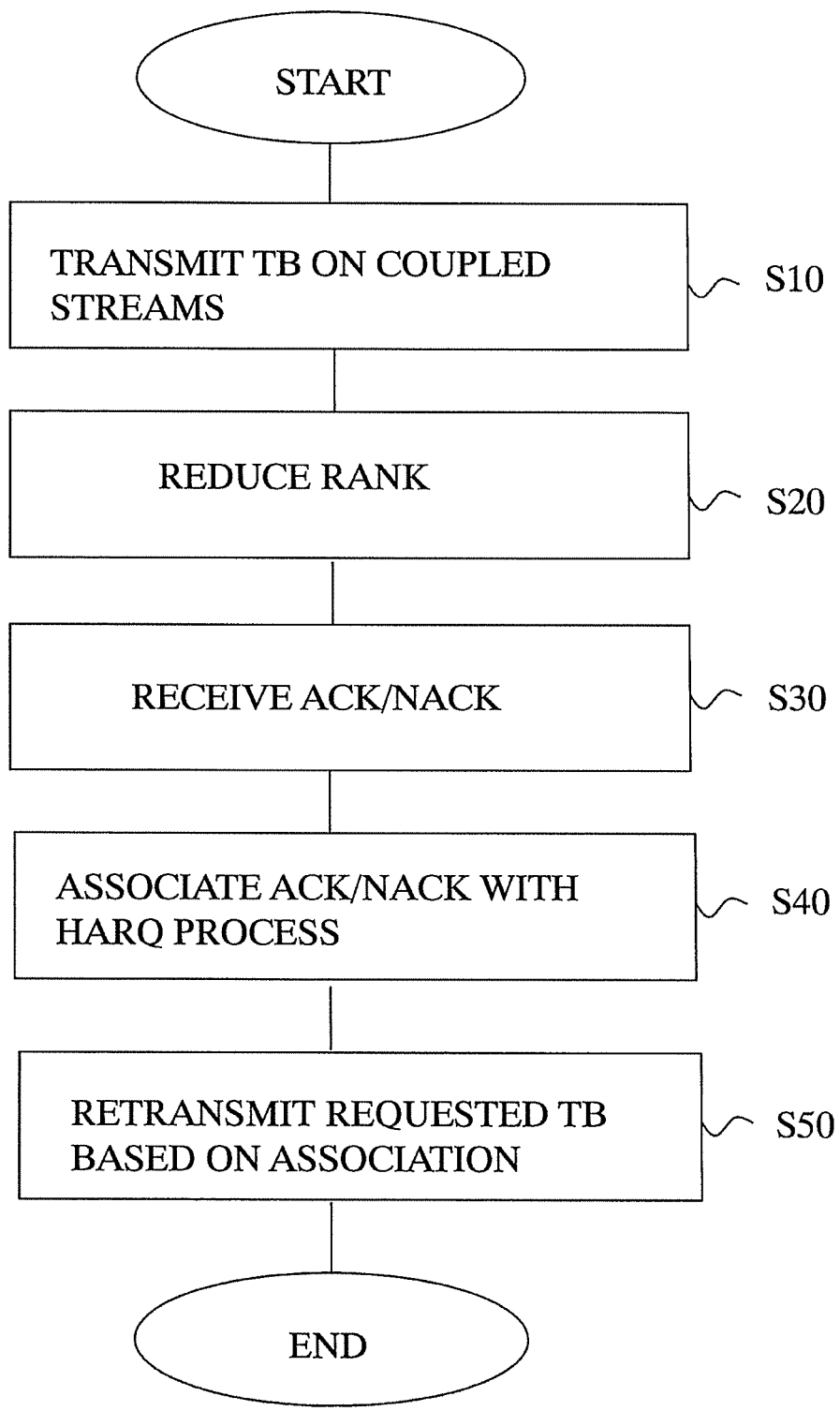
FIG. 6 is a flow chart of an embodiment of a method of the current disclosure.

With reference to FIG. 6, a basic embodiment of a method according to the present technology will be described. Consequently, a basic embodiment of a method in a user equipment (UE) according to the present disclosure includes the steps of transmitting S10 a first transport block of data on a primary stream and a second transport block of data on a secondary stream to a Node B. The transmissions can comprise initial transmissions or retransmissions of previously transmitted data. At some point in time after the transmission of the first and second data block, the rank of the UE has changed S20 from Rank 2 to Rank 1. Subsequently, the UE receives S30 ACK/NACK feedback information e.g. an ACK of the first transport block and a request for retransmission of the second transport block e.g. NACK from the Node B. Consequently, the resource e.g. stream on which the second transport block was initially transmitted is no longer in existence. Subsequently, a step of associating S40 the ACK/NACK feedback information e.g. request for retransmission with the HARQ process or entity of the now cancelled second stream is performed. Thereby, the UE is aware of which HARQ process that is requested for retransmission and performs S50 a stream switch and retransmits the requested transport block on the primary stream instead of the cancelled secondary stream.

As mentioned before, a problem when transmitting TBs on two connected data streams is caused by the fact that retransmissions are sequential and are numbered in a cyclic and sequential manner e.g. 0-7 for the primary stream, 0-7 for the secondary stream. Consequently, there is a need for a mechanism to enable the UE to correctly associate S40 a retransmission request with the proper HARQ process, in particular for the case where the retransmission is to occur on a different data stream than the original transmission due to rank reduction.

Figure 11:
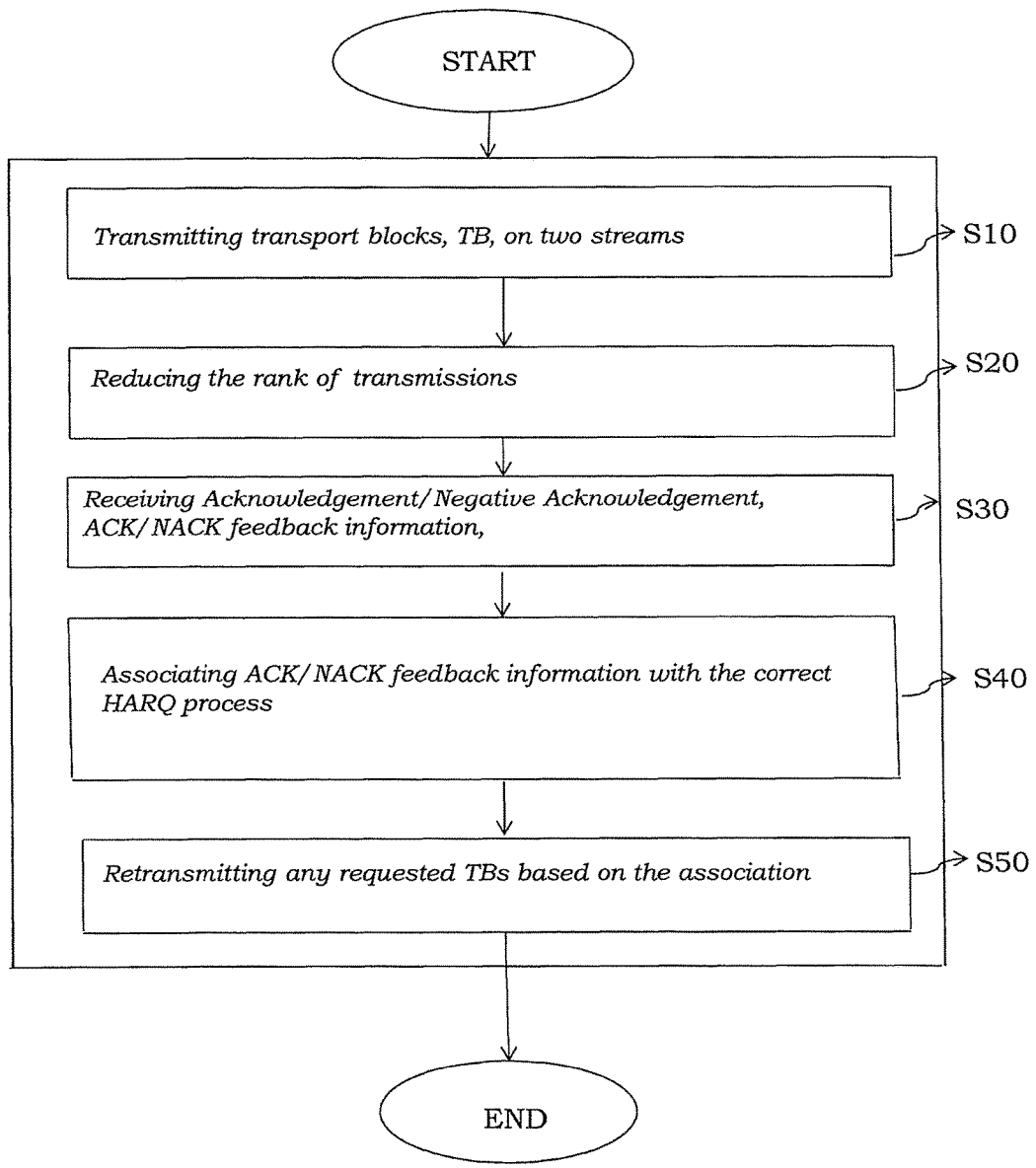
FIG. 11 is a flow diagram illustrating an example of an embodiment of a transmission method according to the present disclosure.

To overcome the mentioned problem there is provided a method performed by a User Equipment, UE, for Hybrid Automatic Repeat Request, HARQ, transmission of data in a multi antenna wireless communication system. The method comprises the steps of, transmitting S10 transport blocks, TBs, on two streams, reducing S20 the rank of transmissions, receiving S30 Acknowledgement/Negative Acknowledgement, ACK/NACK, feedback information, associating S40 the ACK/NACK feedback information with the correct HARQ process, and retransmitting S50 any requested TBs based on the association. The method is schematically illustrated in FIG. 11.

Figure 12:
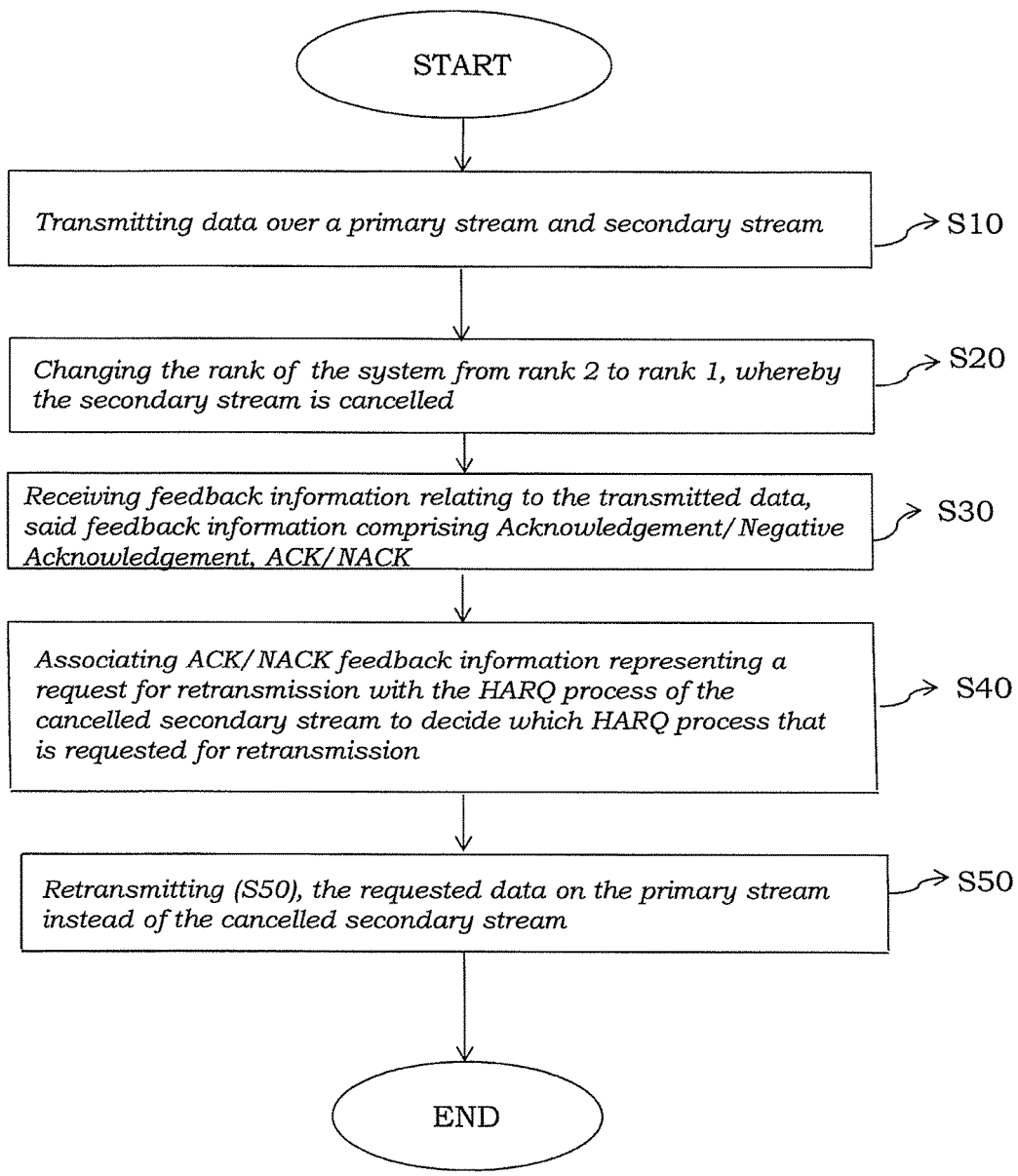
FIG. 12 is a flow diagram illustrating an example of an embodiment of a transmission method according to the present disclosure.

In FIG. 12 there is illustrated an embodiment of the transmission method where the step S20 of reducing the rank of transmission comprises the step of reducing the rank from rank 2, where transmissions is performed over a primary stream and a secondary stream, to rank 1, whereby the secondary stream is cancelled. Feedback information relating to the transmitted data is then received in the receiving step S30. This feedback information comprises ACK/NACK information. The ACK/NACK feedback information, which represent a request for retransmission, is then associated with the HARQ process of the cancelled secondary stream in the associating step S40 to thereby decide which HARQ process that is requested for retransmission.

The proposed method allows for a highly robust and reliable HARQ transmission where a reduction in rank does not lead to an interrupted HARQ retransmission process. Instead the proposed stream switch provides for a way of utilizing the uncancelled stream to perform HARQ retransmissions. To ascertain that the ACK/NACK feedback information is correctly associated with the relevant HARQ process an associating step S40 is utilized in the method. A number of exemplary embodiments of the associating step will be given below.

According to one embodiment, the associating step S40 is based on introducing and monitoring a new parameter (e.g. variable or flag) in the HARQ entity or HARQ process. The parameter serves to provide an indication on whether a stream switch e.g. retransmission of a transmission on a secondary stream is to be performed on a primary stream. Based on the state of the new parameter, any ACK/NACK feedback information is associated with the correct HARQ process or entity.

Figure 14:
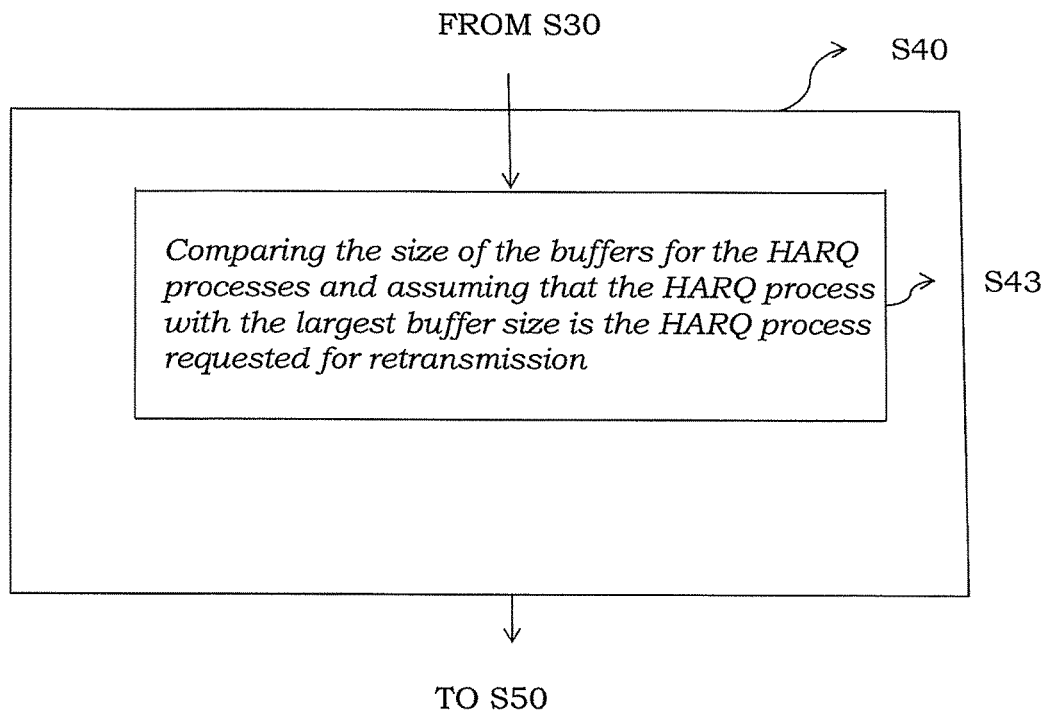
FIG. 14 is a flow diagram illustrating an example of an associating step according to a particular embodiment.
Figure 15:
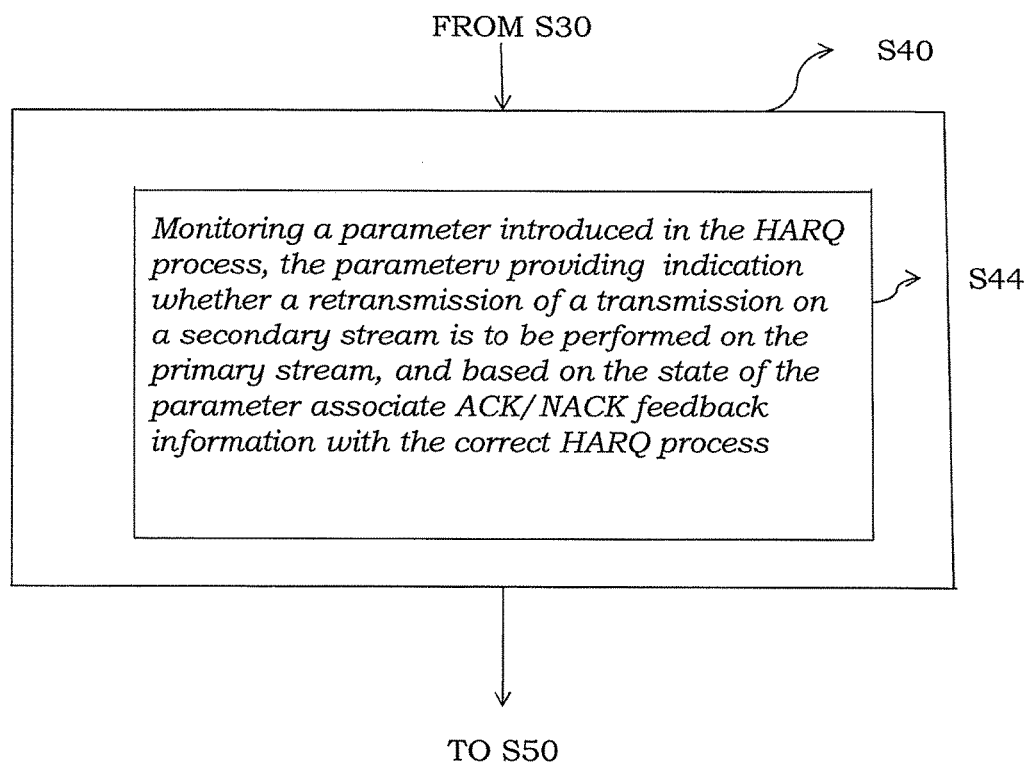
FIG. 15 illustrates an alternative example of an embodiment for performing the associating step according to a particular embodiment.

This particular associating step is schematically illustrated in FIG. 15. As can be inferred from FIG. 14, the HARQ transmission of data as described earlier comprises a step of associating S40, which in turn comprises the step of monitoring S44 a parameter introduced in the HARQ process. The parameter is providing an indication of whether a retransmission of a transmission on the secondary stream is to be performed on the primary stream. Based on the state of said parameter the ACK/NACK feedback information is associated with the correct HARQ process.

Figure 5:
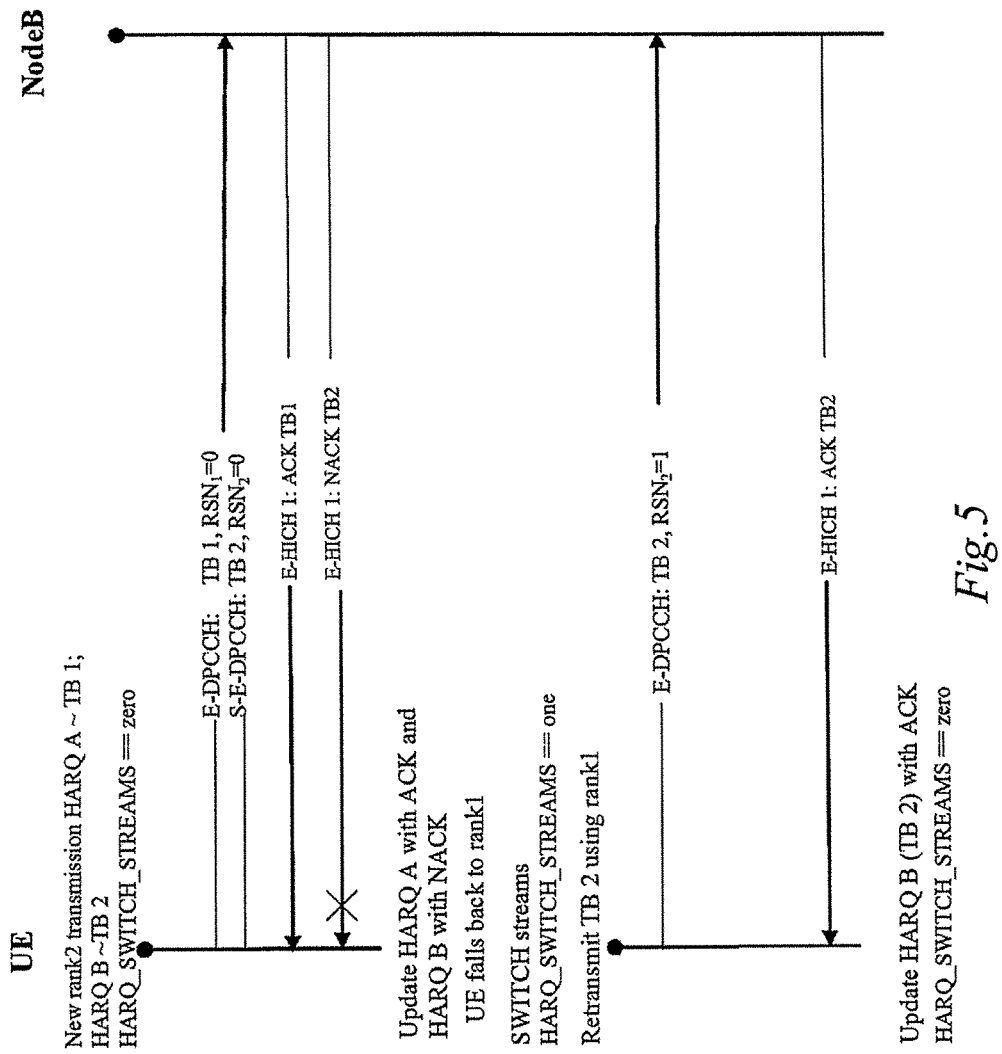
FIG. 5 an illustration of a signaling chart of an embodiment of the current disclosure.

In particular, this parameter, for example called HARQ_SWITCH_STREAMS, is used to keep track of whether a stream switch (as previously described) occurred at the time of transmission. The default value of this parameter is, e.g. zero or FALSE, which indicates that no stream switch occurred at transmission, i.e. HARQ process A is associated with the primary stream and HARQ process B is associated with the secondary stream. Whenever a stream switch occurs, the parameter corresponding to this process is toggled (e.g. set to one or TRUE). Note that this hybrid ARQ functionality can reside in the HARQ entity, wherefore there needs to be one HARQ_SWITCH_STREAMS parameter for each HARQ process pair, i.e. a vector containing HARQ_RTT elements, where each element in the vector is associated with a particular process number (cf. CURRENT_HARQ_PROCESS_ID). Then, when receiving feedback information (one ACK or NACK) the HARQ_SWITCH_STREAMS parameter associated with the correct process is checked. If it is set to TRUE, a stream switch that occurred at transmission has been detected and the feedback information should be associated with HARQ process B. After the feedback information has been processed the HARQ_SWITCH_STREAMS parameter is reset (set to e.g. FALSE or zero). An example of SWITCH stream procedure in case of retransmission only on secondary stream and UE fallback to Rank 1 for UMTS system is illustrated in FIG. 5.

According to a second embodiment, the UE can be configured to correctly associate S40 received ACK/NACK feedback information, e.g. a retransmission request, with the proper HARQ entity or process based on a buffer status of each HARQ entity or process. This is based on the knowledge that a received ACK message causes wiping of the relevant buffer. Thereby, a HARQ entity that has not been targeted with an ACK or a HARQ entity that has been targeted with a NACK will have a non-empty HARQ buffer. Upon receiving a NACK which is not associated with a particular HARQ entity, due to a reduction in rank, the UE can compare the buffer of multiple HARQ entities or processes and safely assume that the buffer that is non-empty or that is largest is to be associated with the received NACK, and initiate retransmission of the relevant TB.

This embodiment of the associating step S40 is schematically illustrated in FIG. 14. Alternatively stated, the method performed by a User Equipment, UE, for Hybrid Automatic Repeat Request, HARQ, transmission of data in a multi-antenna wireless communication system comprises an associating step S40 which, in the case of a single feedback, in turn comprises the step of comparing (S43) the size of the buffers of the HARQ processes and assuming that the HARQ process with the largest buffer size is the HARQ process requested for retransmission. By utilizing information of the size of the buffer of the HARQ processes a reliable HARQ transmission method is obtained that does not need to incorporate more information than is already contained with the UE to determine which particular data that is requested to be retransmitted.

In the present standard [3] the RSN and number of transmission attempts (CURRENT_TX_NB) is updated/set at the time of transmission (new or retransmission), whereas the HARQ buffer is cleared when an ACK feedback is received. Hence, a feasible alternative to determine which HARQ buffer that should be targeted when receiving feedback information (only from the primary E-HICH, i.e. one ACK/NACK) would be to check the buffer status for process A & B, and use the process with a non-empty buffer. Another alternative is to compare the number of transmission attempts (CURRENT_TX_NB) for the two coupled HARQ processes (A & B) when receiving the feedback information (in a scenario with a single feedback). The feedback information is then targeting the HARQ process of A or B with the largest CURRENT_TX_NB. Similarly, one could consider comparing the RSN number, but this is less good since the RSN saturates at 3.

Figure 13:
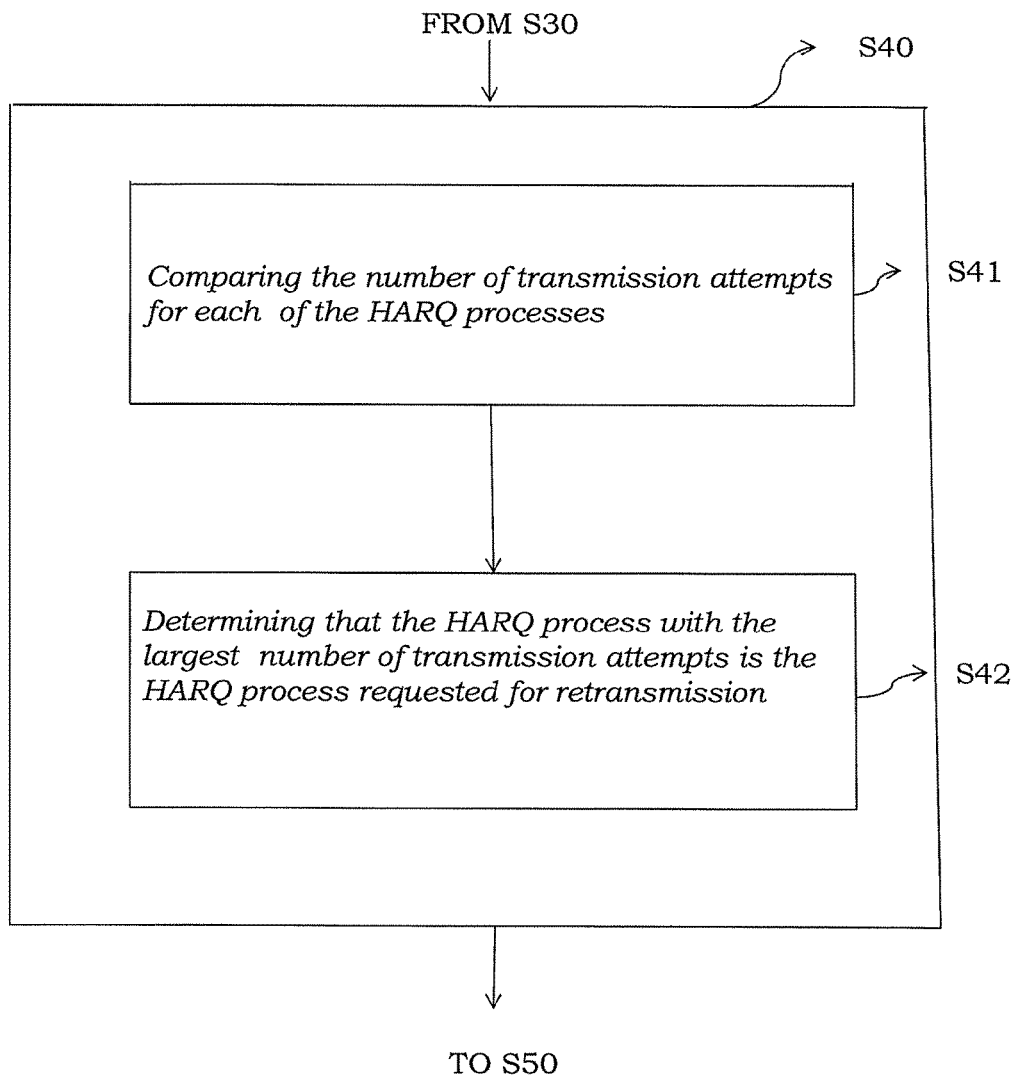
FIG. 13 is a flow diagram illustrating an example of an associating step according to a particular embodiment.

This particular embodiment is schematically illustrated in FIG. 13. Here, for the particular case of a single feedback, the step of associating S40 comprises the steps of comparing S41 the number of transmission attempts for each of the HARQ processes and determining S42 that the HARQ process with the largest number of transmission attempts is the HARQ process requested for retransmission. This particular embodiment of the associating step S40 gives a reliable indication of the HARQ process associated with a received NACK without demanding more information than is already contained in the UE.

All or one of the above-described embodiments can be combined with other information to make the HARQ functionality more robust against e.g. feedback signalling errors. One such source of information is the E-HICH signature (i.e. whether the feedback is received on the primary or the secondary E-HICH). This helps to target the correct HARQ process in scenarios with transmission or feedback errors, for example, in a scenario where one of the two E-HICHes is not detected. This would require that L1 informs the MAC layer about the E-HICH signature(s) that is associated with a received ACK/NACK.

The above given embodiments of the transmission method finds particular use in the case where the UE that is configured to perform the method is configured for uplink Multiple Input Multiple Output, MIMO.

Another desired environment to implement the transmission method performed by the UE pertains to the case where said multi-antenna wireless communication system is a system that is supporting Multiple Input Multiple Output, MIMO, enabled High Speed Uplink Packet Access, HSUPA, with Frequency Division Duplex, FDD.

The embodiments of the transmission method performed by the UE as given earlier are also useful when the two streams are carried on Enhanced Dedicated Channels, E-DCH and said ACK/NACK feedback information are carried on E-DCH Hybrid ARQ indicator Channels, E-HICH.

Figure 7:
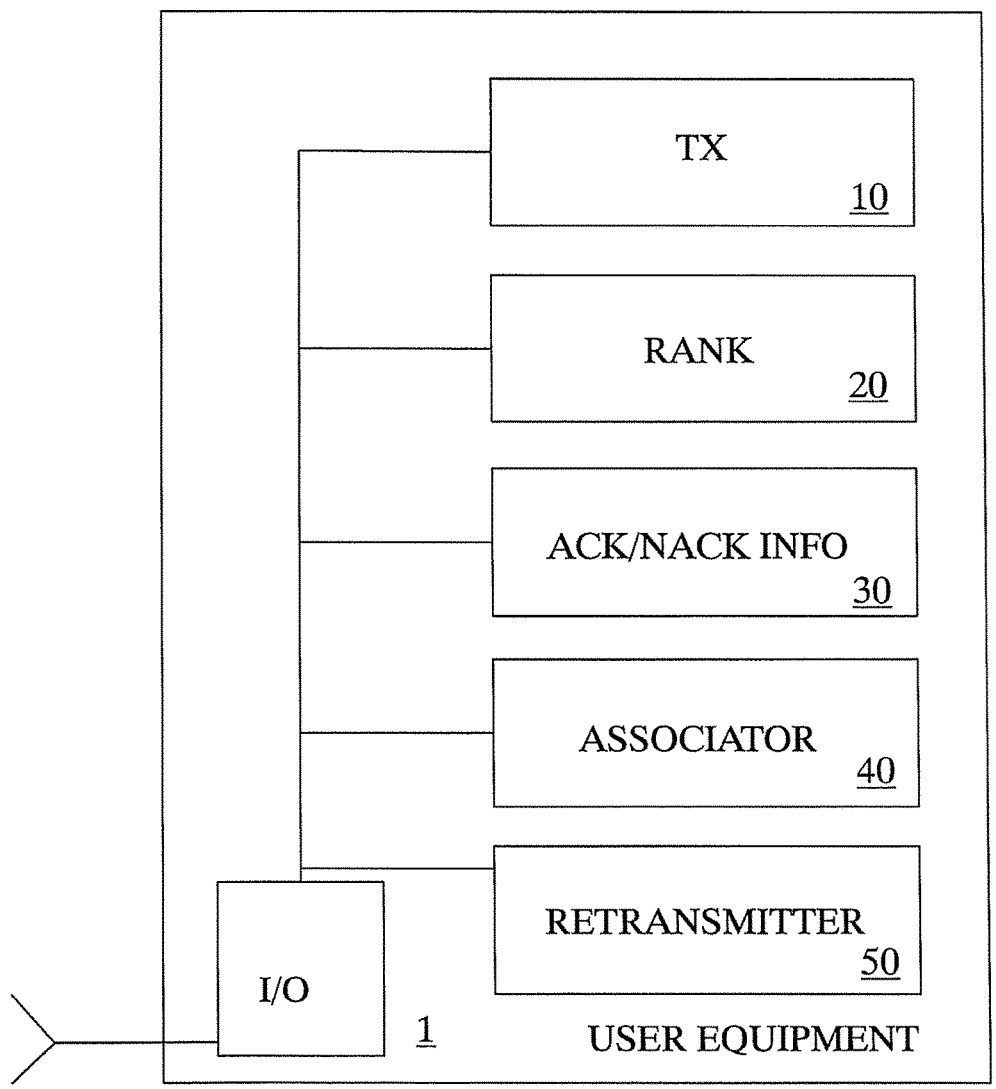
FIG. 7 is a block chart of embodiments of arrangements of the present disclosure.

An embodiment of a UE according to the present technology will now be described with reference to FIG. 7. Although the various units are illustrated as separate units, they can equally well be adapted to form combined units. In particular, the functionality of the present technology is preferably implemented in a MAC i/is unit in a UE. Consequently, a basic embodiment of a user equipment (UE) 1 according to the present disclosure includes a transmitter 10 configured to transmit a first transport block of data on a primary stream and a second transport block of data on a secondary stream to a Node B. The transmissions can comprise initial transmissions or retransmissions of previously transmitted data. At some point in time after the transmission of the first and second data block, the rank of the UE has changed from Rank 2 to Rank 1 in a rank unit 20. Further, the UE includes an ACK/NACK feedback information unit 30 configured to receive ACK/NACK feedback information relating to transmitted TBs from a Node B. An associating unit 40 is configured to associate received ACK/NACK feedback information e.g. request for retransmission with the relevant HARQ process or entity in order to enable retransmissions of correct TBs. Thereby, the UE is aware of which HARQ process that is requested for retransmission. Finally, the UE includes a retransmission unit 50 or a stream switch, which is configured to retransmit any requested transport block based on the association. It is evident that all known functionality and units necessary for the UE to function are included, even though not explicitly illustrated.

Figure 16:
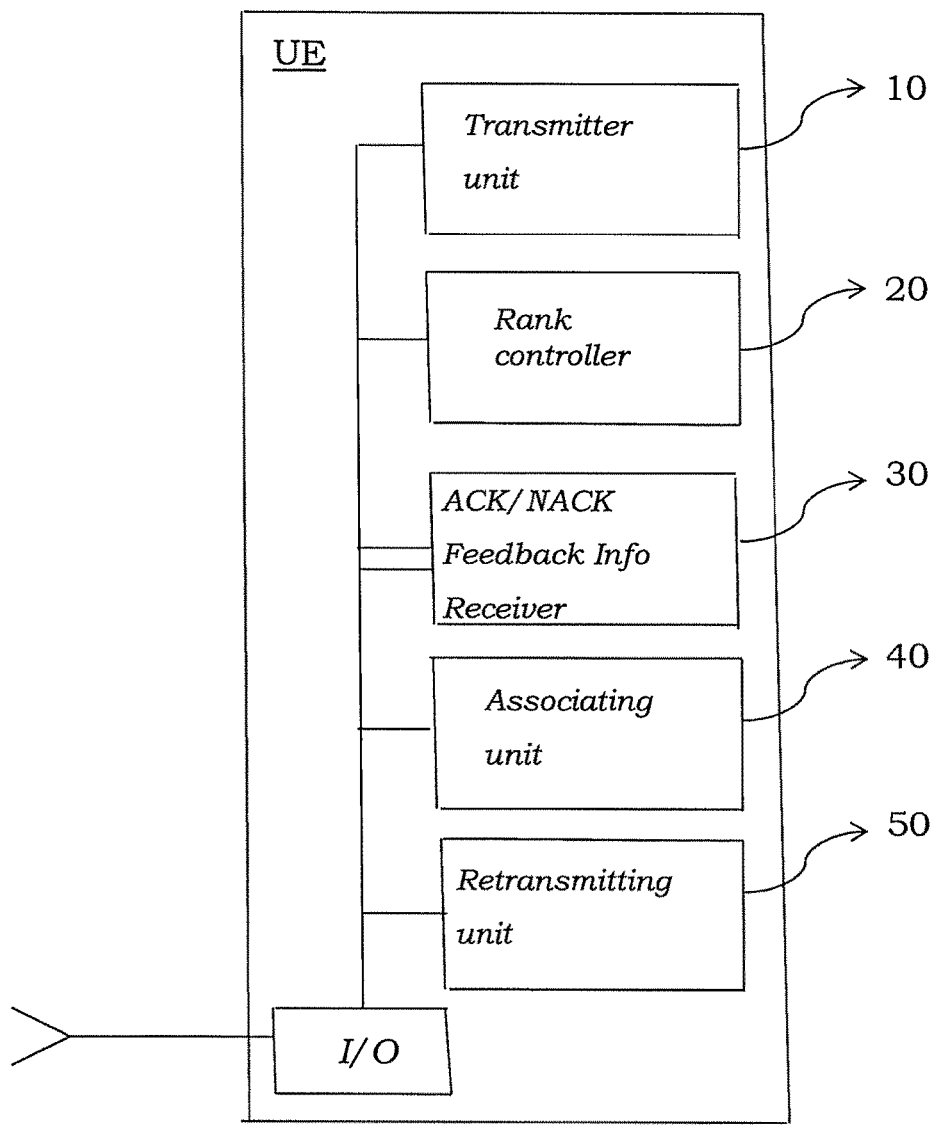
FIG. 16 is a block chart of an example of an arrangement for a UE configured for performing transmissions according to the present disclosure.

Alternatively stated, and shown in FIG. 16, the present disclosure presents an arrangement for a user equipment, UE, configured for HARQ transmission of data, where the arrangement comprises a transmitter unit 10 for transmitting transport blocks, TBs, over two streams, a rank controller 20 that is configured to reduce the rank of transmission and an Acknowledgement/Negative Acknowledgement, ACK/NACK feedback information receiver 30 that is configured to receive ACK/NACK feedback relating to the transmitted transport blocks. The arrangement further comprises an associating unit 40 that is configured for associating the received ACK/NACK feedback information with the correct HARQ process. Moreover it also comprises a retransmitting unit 50 that is configured for retransmitting any requested TBs based on the association.

According to a particular embodiment, the associating unit 40 can be configured to associate received ACK/NACK feedback information with the relevant HARQ entity or process based on either a novel parameter indicating an occurred stream switch, or based on monitoring the HARQ buffers. Consequently, the associating unit 40 or a unit in communication with the associating unit 40 is configured to provide a parameter (e.g. variable or flag) in the HARQ entity or HARQ process. The parameter serves to provide an indication on whether a stream switch e.g. retransmission of a transmission on a secondary stream is to be performed on a primary stream. Based on at least a current state of the parameter, the associating unit is configured to associate any ACK/NACK feedback information with the correct HARQ process or entity.

Further, according to another embodiment, the associating unit 40 can be configured to associate received ACK/NACK feedback information, e.g. a retransmission request, with the proper HARQ entity or process based on a buffer status of each HARQ entity or process. This can be based on the knowledge that a received ACK message typically causes wiping of the relevant buffer. Thereby, a HARQ entity that has not been targeted with an ACK or a HARQ entity that has been targeted with a NACK will have a non-empty HARQ buffer. Upon receiving a NACK, which is not associated with a particular HARQ entity, due to a reduction in rank, the UE e.g. associating unit 40 can be configured to compare the buffers of multiple HARQ entities or processes and associate the buffer that is non-empty or that is largest is to be with the received NACK.

With relation to the above-described embodiments, two examples will be discussed below. In the examples only one HARQ process pair is considered, e.g. process A and process B. All other processes are omitted. However, the skilled person can easily adapt the teachings for a plurality of HARQ process pairs.

Example 1 (for Reference, See Table 1 in FIG. 21)

Figure 19:
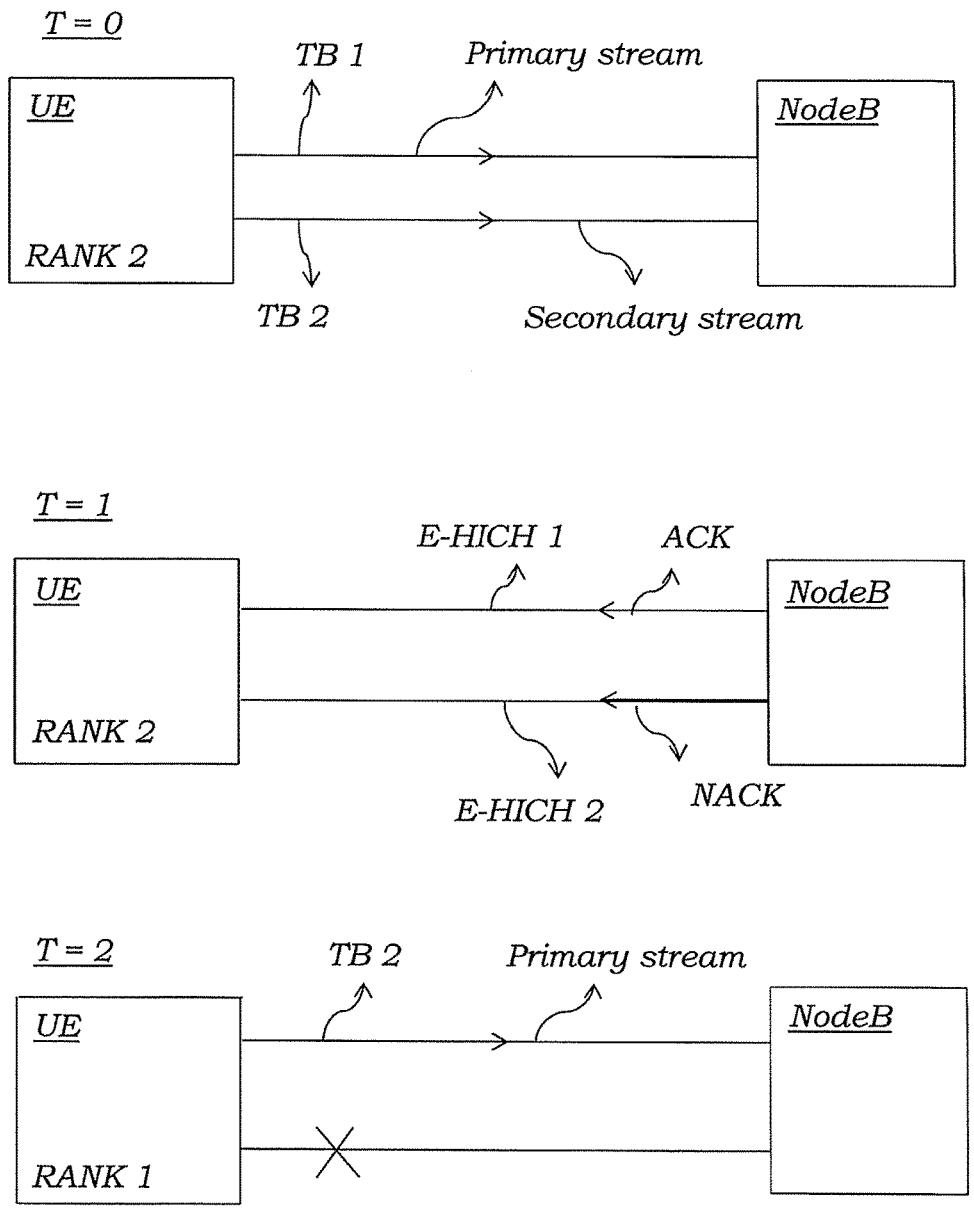
FIG. 19 illustrates an exemplary signaling chart for an embodiment of the present disclosure.

At time 0 a retransmission is conveyed on the primary stream and a new transmission is conveyed on the secondary stream. The Node B decodes the primary stream but fails to decode the secondary stream. Hence, at time 1 when the UE receives ACK/NACK feedback, the HARQ buffer associated with process A is cleared (ACK). At time 2, the rank has changed to one and process B needs to be re-transmitted. Hence, the TB associated with process B is retransmitted on stream 1. This particular sequence is illustrated in FIG. 19. At time 3 when the UE receives the ACK/NACK feedback, it needs to decide which HARQ process (A or B) that is targeted by the E-HICH feedback. It is clear that the HARQ entity cannot extract this information by looking at RSN or number of transmission (trans) since they are identical for both processes. The default behavior would then be to associate the feedback information with process A, which would be wrong in this case. Hence, it needs to consider the buffer status or know that a stream switch occurred at transmission (indicated by some parameter/flag/variable) in order to target the correct HARQ process B.

Example 2 (See Table 2 Below)

At time 0 two new packets are conveyed in a rank2 transmission. The Node B fails to decode the primary stream but manage to decode the secondary stream, hence sending NACK on the primary E-HICH and ACK on the secondary E-HICH at time 1. Unfortunately, the UE misses to detect the primary E-HICH, and only receives ACK on the secondary E-HICH. The normal procedure would be that L1 forwards one ACK to the MAC layer and clear the soft buffer associated with Process A, which would lead to an RLC retransmission. Alternatively, the UE has to guess whether the ACK corresponds to process A or B. To avoid a potential RLC retransmission the UE has to ignore the ACK and assume that both processes are NACKed. A better approach would be that the L1 informs the MAC layer about which E-HICH (e.g. signature) that conveyed the ACK/NACK info. In this example, the HARQ entity would then know that the ACK came on the secondary E-HICH, which means that the soft buffer associated with HARQ process B should be cleared. Furthermore, it would know that it is impossible to get a ACK/NACK message on the secondary E-HICH without getting one at the primary E-HICH. Hence, it would know that the primary E-HICH was miss-detected and count that as a NACK (if not another link in the active set conveys an ACK).

The TB associated with the HARQ process is now retransmitted S50 on the primary stream since the UE is still in rank 1 transmission mode. Finally it is received an ACK feedback

TABLE 2

| | | | UE | | | | | | | | Node B | |
|---|---|---|---|---|---|---|---|---|---|---|---|---|
| | | | HARQ A | | | | HARQ B | | | | | |
| Time | Rx/Tx | Rank | RSN | Trans | Buffer | Stream | RSN | Trans | Buffer | Stream | E-HICH1 | E-HICH2 |
| 0 | Tx | 2 | 0 | 0 | TB 1 | 1 | 0 | 0 | TB 2 | 2 | | |
| 1 | Rx | — | | | | | | | | | NACK which is not detected by UE | ACK |

Figure 20:
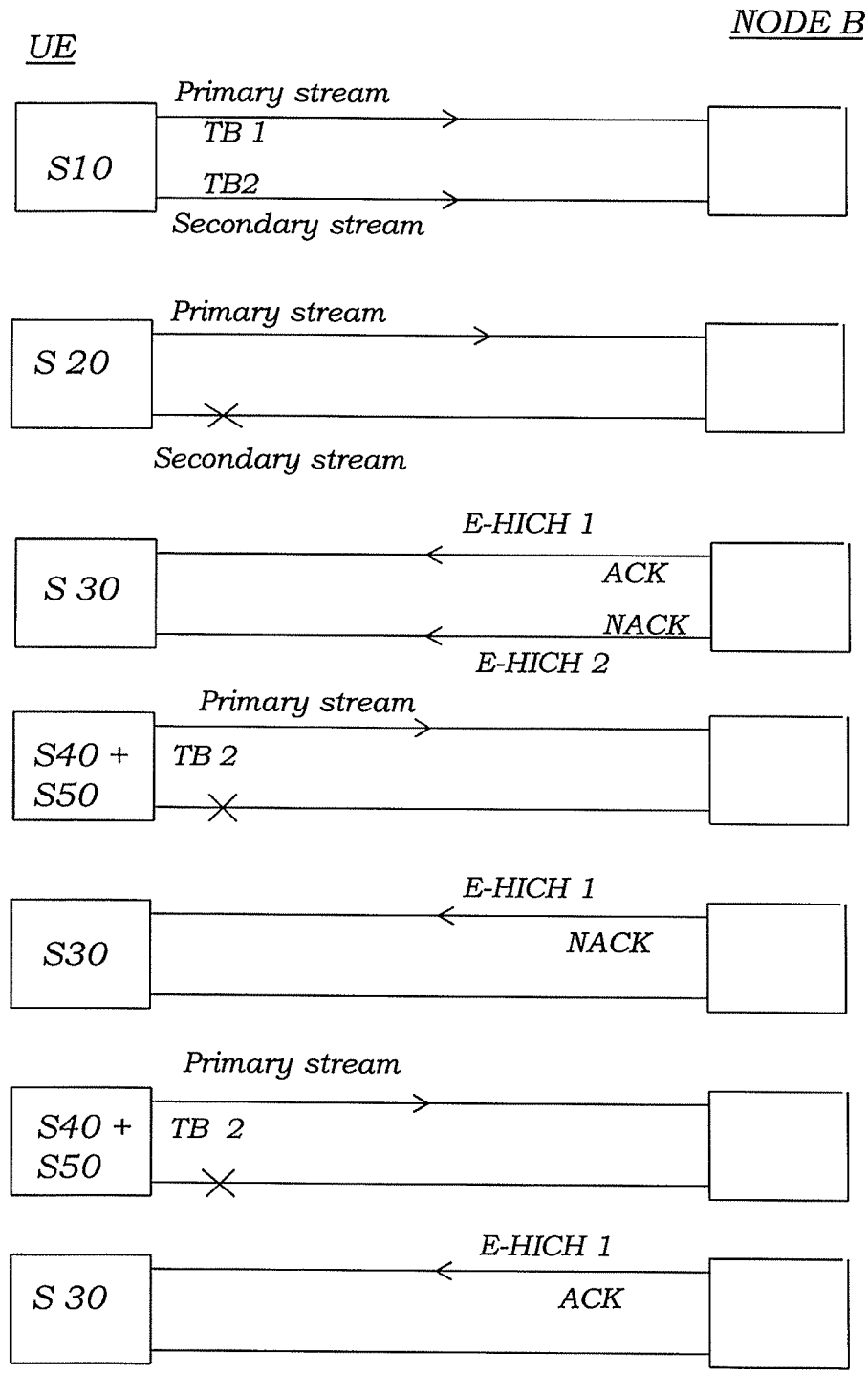
FIG. 20 illustrates an alternative exemplary signaling chart for an embodiment of the present disclosure.

To further add to the understanding of the proposed technology reference is made to FIG. 20. FIG. 20 illustrates a transmission scenario as described above but in this example a longer time span is illustrated. This example is intended to illustrate the repetitive nature of the proposed transmission and retransmission steps. By studying this example it will be appreciated how the proposed methods provide for robust HARQ retransmissions that efficiently utilizes the available stream resources even after a reduction in rank.

At first, data, in the present case having the form of transport blocks, TB, are transmitted S10 in rank 2 transmission mode. As illustrated, TB 1 is transmitted on the primary stream and TB 2 is transmitted on the secondary stream.

Subsequently, the rank of the UE is reduced S20 from rank 2 transmission mode to rank 1 transmission mode, whereby the secondary stream is cancelled and the primary stream is retained for subsequent transmission.

Following the initial transmission, ACK/NACK feedback information relating to the transport blocks transmitted on the primary and secondary stream, respectively, is received from downlink channels in a step S30. The ACK/NACK feedback information is associated to the correct HARQ process in an associating step S40. In this particular example TB 2, originally transmitted on the secondary stream, is targeted with a NACK. To correctly associate the ACK/NACK feedback information with the correct TB it is possible to use, for example, the signatures of the downlink channels, E-HICH 1 and E-HICH 2. Other possibilities might however be possible.

Following the received ACK/NACK feedback information the correctly associated S40 TB 2 are then retransmitted S50 on the primary stream in rank 1 transmission mode.

At a later point in time ACK/NACK feedback information relating to the TB 2 retransmitted on the primary stream is received in step S30. This single feedback information now carries information relating to the TB that was retransmitted on the primary stream during rank 1 transmission mode.

Based on the received ACK/NACK feedback information, the associating step S40 is now performed on the single feedback information to associate the ACK/NACK feedback information with the correct HARQ process. In this particular example a NACK was received, thus requesting a retransmission of TB 2. Any embodiment of the method steps S41, S42, S43 and S44 proposed for a single feedback can be used to correctly associate the ACK/NACK feedback information with the correct HARQ process.

from the Node B. At this point the initial transmission has been completed and the UE prepares for the next transmission based on the rank status.

As can be seen in this particular scenario the retransmissions can continue until all initially transmitted transport blocks have obtained an ACK. After that a new transmission may be initialized based on the rank status of the UE. In the above given example, the TB originally transmitted on the secondary stream where targeted with a NACK. It might however also be the case that the TB initially transmitted on the primary stream, that is TB 1 in this example, is targeted with a NACK. In this case the retransmission as well as the original transmission will take place on the primary stream. There is therefor no need to perform the earlier described stream switch. Instead the retransmission will be performed over the primary stream.

The embodiments of the disclosure are described in a single carrier setup, but are also applicable to multi-carrier scenarios. The idea can also be extended to cover even higher order MIMO systems (not only 2×2 as considered here).

Figure 8:
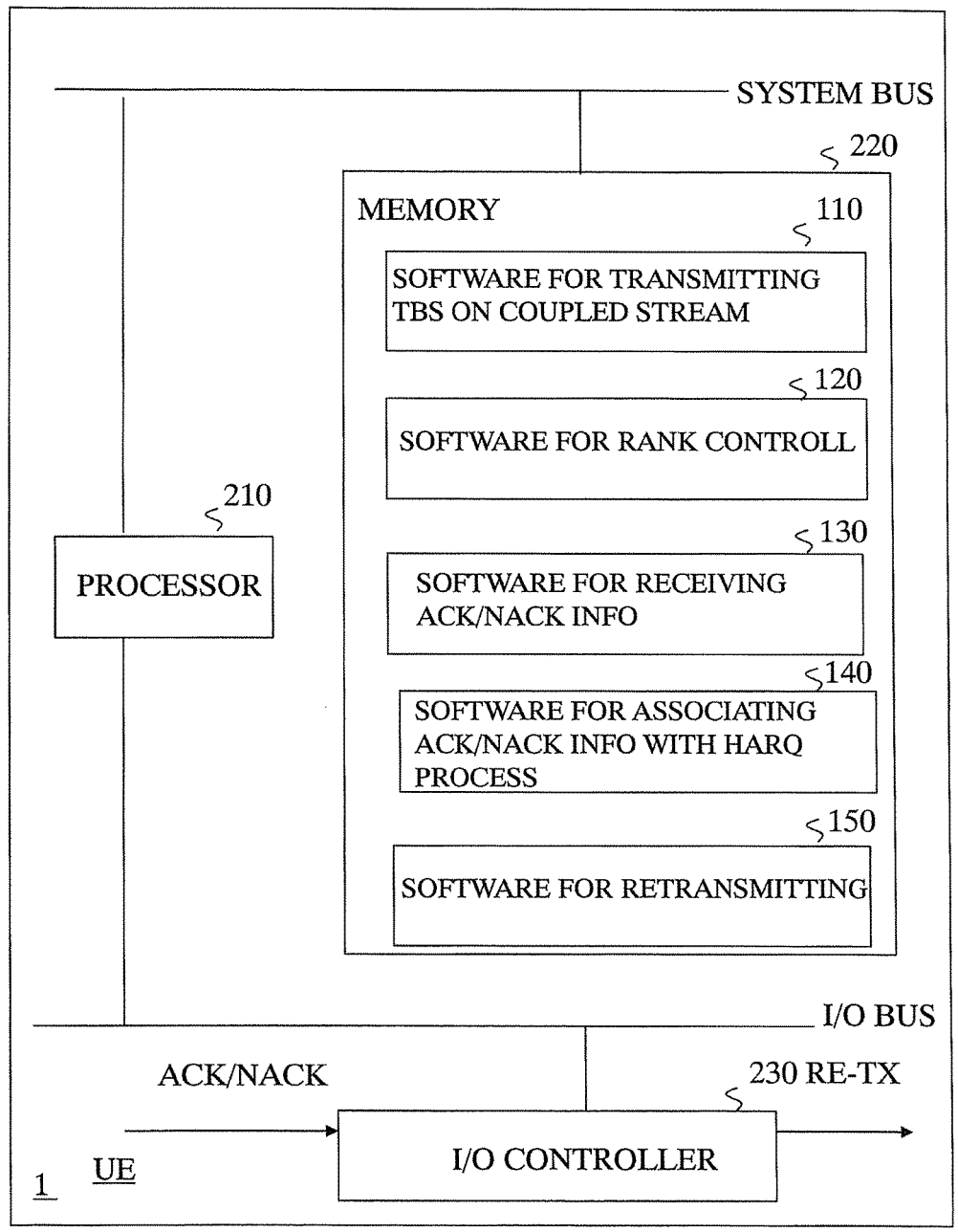
FIG. 8 is an illustration of a computer implementation of the current technology.

In the following, an example of an embodiment of an arrangement in a user equipment 1 will be described with reference to FIG. 8. This embodiment is based on a processor 210, for example a micro processor, which executes a software component 110 for transmitting transport blocks on a primary and a secondary stream, a software component 120 for controlling the rank of the transmissions e.g. by reducing the rank if necessary, and a software component 130 for receiving ACK/NACK feedback information from a Node B. These software components are stored in memory 220. The processor 210 communicates with the memory over a system bus. Signals are received by an input/output (I/O) controller 230 controlling an I/O bus, to which the processor 210 and the memory 220 are connected. In this embodiment, the signals received by the I/O controller 230 are stored in the memory 220, where they are processed by the software components. Software component 110 may implement the functionality of the transmission step S10. Software component 120 may implement the functionality of the rank controlling step S20. Software component 130 may implement the functionality of the ACK/NACK receiving step S30, and the software component 140 may implement the functionality of the ACK/NACK associative step S40. Finally, software component 150 may implement the functionality of the retransmission or stream switching step S50.

The I/O unit 230 may be interconnected to the processor 210 and/or the memory 220 via an I/O bus to enable input and/or output of relevant data such as input parameter(s) and/or resulting output parameter(s).

At least some of the steps, functions, procedures, and/or blocks described above may be implemented in software for execution by a suitable processing device, such as a microprocessor, Digital Signal Processor (DSP), and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

Advantages of the Present Disclosure Include:

Enabling HARQ process to always be correctly ACKed or NACKed in case a TB associated with HARQ process 2 that was initially transmitted on the secondary stream gets retransmitted on the primary stream using rank1. This will cause less data transmission errors (RLC retransmissions) and consequently increase the performance.

Together with additional information, e.g. the E-HICH identity (signature for stream 1 or stream 2) the HARQ functionality can be made more robust against feedback/detection errors.

Ensure that correct soft buffer is targeted and the correct soft buffer can be flushed or kept for successful or unsuccessful transmission.

Ensure or robustify correct soft combining in case of MIMO and/or soft handover

No need to re-design the control channel structures or introduce an explicit HARQ identity number that would give an increased signaling overhead. Although the present disclosure is described in the context of a WCDMA HSUPA MIMO with FDD, it is equally applicable to other similar systems.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

REFERENCES

[1] RP-111642, "WI: MIMO with 64QAM for HSUPA", Nokia Siemens Networks
[2] R1-124014, LS on RAN1 agreements on MIMO with 64QAM for HSUPA
[3] 3GPP TS 25.321, Medium Access Control
[4] 3GPP TS 25.212, Multiplexing and Channel Coding (FDD)

The invention claimed is:

1. A method performed by a User Equipment, UE, for Hybrid Automatic Repeat Request, HARQ, retransmission of data in a multi-antenna wireless communication system, comprising:

receiving Acknowledgement/Negative Acknowledgement, ACK/NACK, feedback information relating to first data transmitted on a primary stream and second data transmitted on a secondary stream, wherein the first data transmitted on the primary stream is associated with a first HARQ process and the second data transmitted on the secondary stream is associated with a second HARQ process, associating the received ACK/NACK feedback with a correct HARQ process, the correct HARQ process comprising either the first HARQ process or the second HARQ process; and retransmitting any requested data based on the association.

2. The method according to claim 1, further comprising reducing a transmission rank.

3. The method according to claim 2, wherein the step of reducing the transmission rank comprises the step of reducing the rank from rank 2, where said transmitting is performed over the primary stream and the secondary stream, to rank 1, whereby the secondary stream is cancelled and wherein the correct HARQ process is the second HARQ process.

4. The method according to claim 1, wherein the correct HARQ process is the second HARQ process and said retransmitting step comprises retransmitting data associated with a NACK from the secondary stream over the primary stream.

5. The method according to claim 1, wherein said associating step comprises the step of deciding which of either the first HARQ process or the second HARQ process should be targeted when the ACK/NACK information is received.

6. The method according to claim 1, wherein said step of associating, in the case of a single feedback, comprises the steps of:
determining a number of transmission attempts for each of the first and second HARQ processes; and
determining that the HARQ process with the largest of said number of transmission attempts is the correct HARQ process requested for retransmission.

7. The method according to claim 1, wherein said step of associating, comprises the steps of:
comparing buffer sizes of the first and second HARQ processes and assuming that the HARQ process with a largest buffer size is the correct HARQ process requested for retransmission.

8. The method according to claim 1, wherein the step of associating, comprises the step of:
monitoring a parameter introduced in the second HARQ process, said parameter providing an indication of whether a retransmission of a transmission on the secondary stream is to be performed on the primary stream, and based on the state of said parameter, associate the ACK/NACK feedback information with the correct HARQ process.

9. The method according to claim 8, wherein said parameter is a parameter whose default value is set to zero or false, indicating that no TBs initially transmitted on the secondary stream were transmitted on the primary stream, and whose value is set to one or true if TB(s) initially transmitted on the secondary stream are retransmitted on the primary stream.

10. The method according to claim 1, wherein the step of associating is combined with the use of information about a signature of one or more channels carrying the ACK/NACK feedback information to target the correct HARQ process associated with said ACK/NACK feedback information.

11. The method according to claim 1, wherein said UE is configured for uplink Multiple Input Multiple Output, MIMO.

12. The method according to claim 1, wherein said multi-antenna wireless communication system is a system supporting Multiple Input Multiple Output, MIMO, enabled High Speed Uplink Packet Access, HSUPA, with Frequency Division Duplex, FDD.

13. The method according to claim 1, wherein said primary and secondary streams are carried on Enhanced Dedicated Channels, E-DCH and said ACK/NACK feedback information is carried on E-DCH Hybrid ARQ indicator Channels, E-HICH.

14. An arrangement for a user equipment, UE, configured for HARQ transmission of data, comprising:
 a transmitter unit configured to transmit transport blocks, TBs, over two streams;
 an Acknowledgement/Negative Acknowledgement, ACK/NACK feedback information receiver configured to receive ACK/NACK feedback relating to the transmitted transport blocks, wherein a first stream is associated with a first HARQ process and a second stream is associated with a second HARQ process;
 an associating unit configured to associate ACK/NACK feedback information with a correct HARQ process, the correct HARQ process comprising either the first HARQ process or the second HARQ process; and
 a retransmitting unit, configured to transmit any requested TBs based on the association.

15. The arrangement according to claim 14, further comprising:
 a rank controller configured to reduce a transmission rank.

16. The arrangement according to claim 15, wherein said rank controller is further configured to reduce the rank from rank 2, wherein transmission of TBs is performed over the first stream and the second stream, to rank 1, wherein the secondary stream is cancelled.

17. The arrangement according to claim 15, wherein said rank controller is a rank unit.

18. The arrangement according to claim 14, wherein said associating unit is further configured to determine a number of attempted retransmissions of the first and second HARQ processes.

19. The arrangement according to claim 14, wherein said associating unit is further configured to compare two or more buffer sizes of the first and second HARQ processes.

20. The arrangement according to claim 14, wherein said associating unit is further configured to introduce and monitor a parameter in the second HARQ process, said parameter providing an indication of whether a retransmission of a transmission on the secondary stream is to be performed on the primary stream, and based on the state of said parameter associate the ACK/NACK feedback information with the correct HARQ process.

21. The arrangement according to claim 20, wherein said associating unit is further configured to set a default value of said parameter to zero or false, said default value indicating that no data initially transmitted on the secondary stream was transmitted on the primary stream, and set the parameter to one or true if data initially transmitted on the secondary stream is retransmitted on the primary stream.

22. The arrangement according to claim 14, wherein said associating unit is further configured to use information about a signature of one or more channels carrying the ACK/NACK feedback information to target the correct HARQ process associated with said ACK/NACK feedback information.

23. The arrangement according to claim 14, wherein said UE is configured for uplink Multiple Input Multiple Output, MIMO.

24. The arrangement according to claim 14, wherein said UE is configured for Multiple Input Multiple Output, MIMO, and High Speed Uplink Packet Access, HSUPA, with Frequency Division Duplex, FDD.

25. The arrangement according to claim 14, wherein said two streams are carried on Enhanced Dedicated Channels, E-DCHs and said feedback information is carried on E-DCH Hybrid ARQ Indicator Channels, E-HICHs.

* * * * *

UNITED STATES PATENT AND TRADEMARK OFFICE
CERTIFICATE OF CORRECTION

PATENT NO. : 10,027,387 B2
APPLICATION NO. : 15/446941
DATED : July 17, 2018
INVENTOR(S) : Lidian et al.

Page 1 of 2

It is certified that error appears in the above-identified patent and that said Letters Patent is hereby corrected as shown below:

In Fig. 2, Sheet 2 of 21, delete "MAC Control" and insert -- MAC --, therefor.

Figure 3:
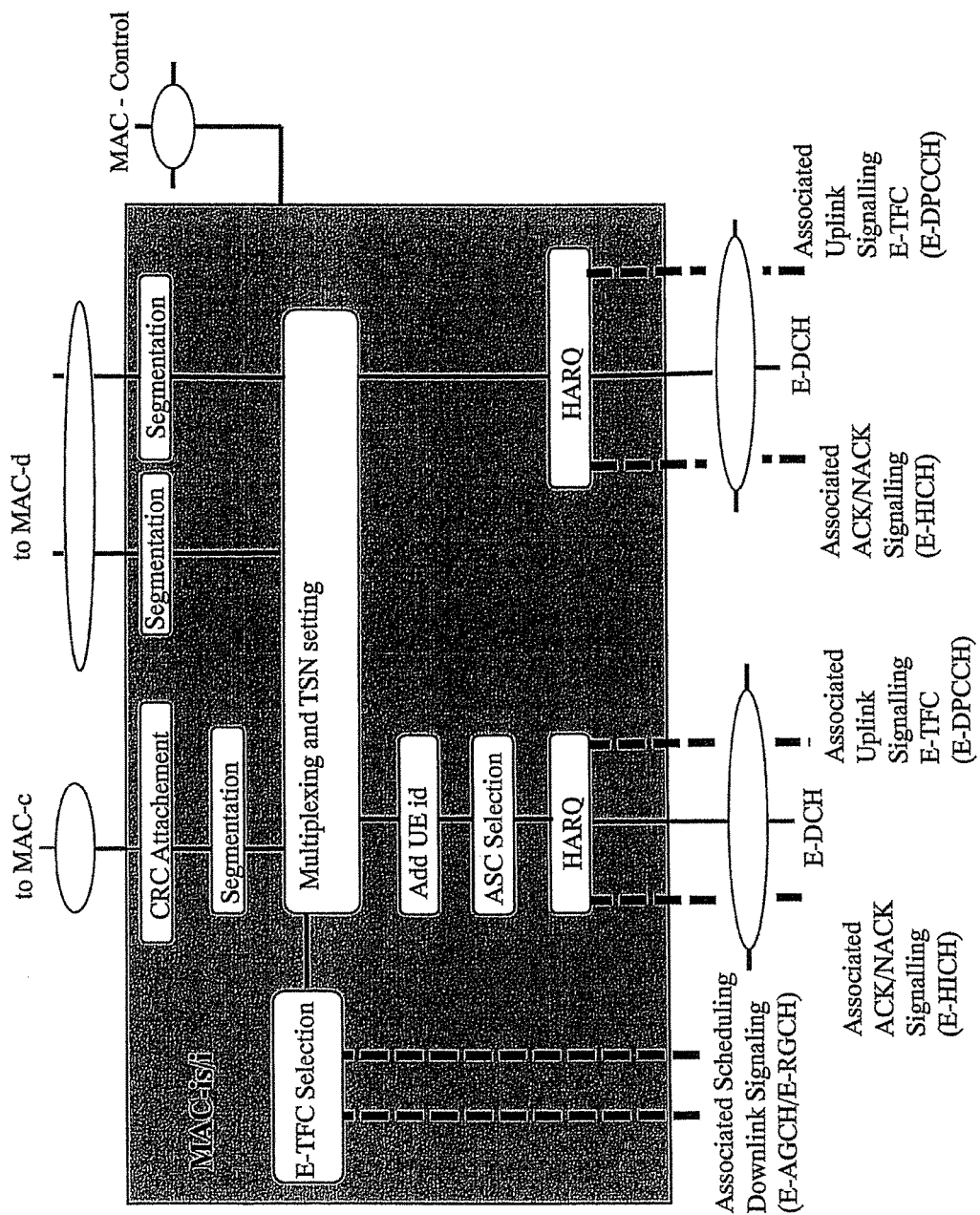
FIG. 3 is an illustration of the UE side MAC i/is.

In Fig. 3, Sheet 3 of 21, delete "MAC-Control" and insert -- MAC --, therefor.

In Fig. 11, Sheet 11 of 21, for Step "S30", in Line 2, delete "information," and insert -- information --, therefor.

In Column 1, Line 8, delete "2014," and insert -- 2014, now Pat. No. 9,590,704, --, therefor.

In Column 1, Line 34, delete "from" and insert -- for --, therefor.

In Column 1, Line 42, delete "layer" and insert -- control --, therefor.

In Column 2, Line 23, delete "E-E-DPCCH," and insert -- E-DPCCH, --, therefor.

In Column 2, Line 24, delete "Data Control" and insert -- Data --, therefor.

In Column 3, Line 41, delete "system;" and insert -- system. --, therefor.

In Column 3, Line 42, delete "architecture" and insert -- architecture. --, therefor.

In Column 3, Line 43, delete "i/is;" and insert -- i/is. --, therefor.

In Column 3, Line 45, delete "disclosure;" and insert -- disclosure. --, therefor.

In Column 3, Line 46, delete "FIG. 5 an" and insert -- FIG. 5 is an --, therefor.

In Column 3, Line 47, delete "disclosure;" and insert -- disclosure. --, therefor.

In Column 3, Line 49, delete "disclosure;" and insert -- disclosure. --, therefor.

Signed and Sealed this
Eleventh Day of September, 2018

Andrei Iancu
*Director of the United States Patent and Trademark Office*

CERTIFICATE OF CORRECTION (continued)
U.S. Pat. No. 10,027,387 B2

In Column 3, Line 51, delete "disclosure;" and insert -- disclosure. --, therefor.

In Column 5, Line 15, delete "MAC Control" and insert -- MAC --, therefor.

In Column 5, Line 45, delete "TTI The" and insert -- TTI. The --, therefor.

In Column 5, Line 54, delete "MAC-Control" and insert -- MAC --, therefor.

In Column 12, Line 10, delete "(S43)" and insert -- S43 --, therefor.

In Column 12, Line 54, delete "E-HICHes" and insert -- E-HICHs --, therefor.

In Column 13, Line 43, delete "NACK" and insert -- NACK, --, therefor.

In Column 19, Line 20, in Claim 14, delete "ACK/NACK" and insert -- ACK/NACK, --, therefor.